US012707308B2

(12) United States Patent
Ramachandra et al.

(10) Patent No.: US 12,707,308 B2
(45) Date of Patent: Aug. 11, 2026

(54) MEASUREMENT REPORTING IN A WIRELESS COMMUNICATION NETWORK

(71) Applicant: Telefonaktiebolaget LM Ericsson (publ), Stockholm (SE)

(72) Inventors: Pradeepa Ramachandra, Linköping (SE); Joel Berglund, Linköping (SE); Henrik Rydén, Stockholm (SE); Marco Belleschi, Solna (SE); Pablo Soldati, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 756 days.

(21) Appl. No.: 17/913,506

(22) PCT Filed: Mar. 31, 2021

(86) PCT No.: PCT/SE2021/050296

§ 371 (c)(1),
(2) Date: Sep. 22, 2022

(87) PCT Pub. No.: WO2021/201762

PCT Pub. Date: Oct. 7, 2021

(65) Prior Publication Data

US 2023/0143060 A1 May 11, 2023

Related U.S. Application Data

(60) Provisional application No. 63/002,412, filed on Mar. 31, 2020.

(51) Int. Cl.
*H04W 24/10* (2009.01)

(52) U.S. Cl.
CPC .................................. *H04W 24/10* (2013.01)

(58) Field of Classification Search
CPC ............. H04W 24/10; H04W 36/0058; H04W 36/0083; H04W 36/00837; G06N 20/00
See application file for complete search history.

(56) References Cited

U.S. PATENT DOCUMENTS 10,856,168 B2 * 12/2020 Kim ...................... H04W 24/10
2013/0208601 A1 * 8/2013 Cui ...................... H04W 24/10 370/252

(Continued)

FOREIGN PATENT DOCUMENTS

WO 2017162262 A1 9/2017
WO 2020051844 A1 3/2020

OTHER PUBLICATIONS

Ericsson, "Enhancing CA Utilization", 3GPP TSG-RAN WG2 Meeting #99, Tdoc R2-1709532, Berlin, Germany, Aug. 21-25, 2017, 1-3.

(Continued)

*Primary Examiner* — Angela Widhalm De Rodriguez
(74) *Attorney, Agent, or Firm* — Murphy, Bilak & Homiller, PLLC

(57) ABSTRACT

A method performed by a wireless device comprises receiving, from a network node in a wireless communication network, signaling that indicates one or more report triggering measurement objects and one or more report content measurement objects. The one or more report triggering measurement objects are one or more objects of measurements whose results are to be evaluated by the wireless device for determining whether to log or send a measurement report. The one or more report content measurement objects are one or more objects of measurements whose results are to be reported by the measurement report. The signaling is configurable to indicate at least one report content measurement object that is different from each of the (Continued)

RECEIVING A MEASUREMENT CONFIGURATION INVOLVING A MEASUREMENT LOGGING TRIGGERING CONDITION BASED ON FIRST SET OF FREQUENCIES' MEASUREMENTS AND A REPORT TRIGGERING CONDITION BASED ON SECOND SET OF FREQUENCIES' MEASUREMENTS AND A MEASUREMENT REPORT CONTENTS RELATED CONFIGURATION BASED ON THIRD SET OF FREQUENCIES' MEASUREMENTS
201

PERFORMING MEASUREMENTS BASED ON FIRST (AND THIRD) SET OF FREQUENCIES
202

IDENTIFYING THAT THE MEASUREMENT LOGGING TRIGGERING CRITERION BASED ON FIRST SET OF FREQUENCIES' MEASUREMENTS HAS BEEN MET
203

PERFORMING MEASUREMENTS BASED ON THE SECOND (AND THIRD) SET OF FREQUENCIES
204

LOGGING THE MEASUREMENTS ASSOCIATED TO THE THIRD SET OF FREQUENCIES
205

IDENTIFYING THAT THE MEASUREMENT REPORT TRIGGERING CRITERION BASED ON SECOND SET OF FREQUENCIES' MEASUREMENTS HAS BEEN MET
206

SENDING THE MEASUREMENT REPORT ASSOCIATED TO THE THIRD SET OF FREQUENCIES' MEASUREMENTS
207 one or more report triggering measurement objects indicated by the signaling.

24 Claims, 22 Drawing Sheets

(56) References Cited

U.S. PATENT DOCUMENTS

| | | | | |
|---|---|---|---|---|
| 2014/0087715 | A1* | 3/2014 | Suzuki | H04W 24/10 |
| | | | | 455/422.1 |
| 2016/0037425 | A1* | 2/2016 | Van Lieshout | H04B 7/024 |
| | | | | 370/332 |
| 2017/0265097 | A1* | 9/2017 | Kim | H04W 24/10 |
| 2020/0413267 | A1* | 12/2020 | Xue | H04W 24/08 |
| 2021/0160721 | A1* | 5/2021 | Panchal | H04W 24/02 |

OTHER PUBLICATIONS

Ericsson, "Triggering condition for A1-A6 events in NR", 3GPP TSG-RAN WG2 #108, Tdoc R2-1915429, Reno, USA, Nov. 18-22, 2019, 1-3.

* cited by examiner

CONTINUED IN FIGURE 9B

MEASUREMENT REPORTING IN A WIRELESS COMMUNICATION NETWORK

TECHNICAL FIELD

The present application relates generally to a wireless communication network, and relates more particularly to measurement reporting in such a network.

BACKGROUND

A wireless communication network typically configures a wireless device to perform measurements and report those measurements to the network. Such measurement reporting supports functionality at the network such as mobility management, positioning, and the like.

The network configures measurement reporting by the wireless device in a number of respects. For example, the network configures what type of measurements the wireless device is to perform, when the wireless device is to perform those measurements, under what conditions the results of those measurements are to trigger the wireless device to send a measurement report to the network, and what the measurement report is to include. The network may also configure on what so-called object(s) the wireless device is to perform measurements. A measurement object in this sense may be a single carrier frequency, a set of one or more carrier frequencies, a set of one or more cells, a set of one or more network identifiers (e.g., Wireless Local Area Network, WLAN, identifiers), a set of one or more transmission resource pools, or any other object on which a signal measurement may be performed.

Known measurement reporting approaches utilize a versatile measurement model for configuring event-based measurement reporting. Under this model, the network configures, among other things, on which measurement object(s) the wireless device is to perform measurements. If the results of the measurements satisfy certain criteria configured by the network, the wireless device generates and sends to the network a measurement report that reports those results; namely, the results of the measurements on those same measurement objects. Measurement reporting supports meaningful functionality when configured in this way, but measurement reporting would prove even more advantageous if it could be configured in a more flexible way, e.g., for supporting machine learning by the network.

SUMMARY

Some embodiments herein enable flexible configuration of measurement objects associated with measurement reporting in a wireless communication network. The wireless communication network in this regard can configure the object(s) of measurements whose results are to trigger a measurement report separately from configuring the object(s) of measurements whose results are to be reported in the measurement report. This separate configuration allows the object(s) of measurements whose results are to be reported in the measurement report to be different from each of the object(s) of measurements whose results are to trigger the measurement report. Accordingly, in some embodiments, the measurement report can flexibly report the results of measurements on any measurement object, irrespective of whether the measurement report was triggered by the results of measurements on that same measurement object. In these and other embodiments, the wireless communication network may exploit the measurement report for realizing enhanced functionality, e.g., mobility decisions based on machine learning.

More particularly, embodiments herein include a method performed by a wireless device configured for use in a wireless communication network. The method comprises receiving, from a network node in the wireless communication network, signaling that indicates one or more report triggering measurement objects and one or more report content measurement objects. The one or more report triggering measurement objects are one or more objects of measurements whose results are to be evaluated by the wireless device for determining whether to log or send a measurement report. The one or more report content measurement objects are one or more objects of measurements whose results are to be reported by the measurement report. In some embodiments, the signaling is configurable to indicate at least one report content measurement object that is different from each of the one or more report triggering measurement objects indicated by the signaling.

In some embodiments, the signaling indicates the one or more report triggering measurement objects separately from indicating the one or more report content measurement objects. In these and other embodiments, the signaling may include a report triggering measurement object information element that indicates the one or more report triggering measurement objects and include a report content measurement object information element that indicates the one or more report content measurement objects.

In some embodiments, the method further comprises performing measurements on the one or more report triggering measurement objects. In this case, the method further comprises, based on results of the measurements performed on the one or more report triggering measurement objects, evaluating whether or not to log or send the measurement report. The method further comprises logging or sending the measurement report, or refraining from logging or sending the measurement report, depending on said evaluating.

In some embodiments, at least one report content measurement object indicated by the signaling is different from each of the one or more report triggering measurement objects indicated by the signaling.

In some embodiments, the signaling includes a report triggering measurement object information element that indicates the one or more report triggering measurement objects and includes a report content measurement object information element that indicates the one or more report content measurement objects.

In some embodiments, the signaling indicates the one or more report triggering measurement objects separately from indicating the one or more report content measurement objects. In these and other embodiments, the signaling may include a report triggering measurement object information element that indicates the one or more report triggering measurement objects and include a report content measurement object information element that indicates the one or more report content measurement objects.

In some embodiments, the signaling indicates one or more report triggering criterions that the wireless device is to evaluate using the results of the measurements on the one or more report triggering measurement objects, and one or more quantities to be reported by the measurement report as the results of the measurements on the one or more report content measurement objects. In one or more of these embodiments, the signaling includes a report triggering configuration information element that indicates the one or more report triggering criterions, and includes a report content configuration information element that indicates the one or more quantities.

In some embodiments, at least one of the one or more report triggering measurement objects is associated with multiple report triggering criterions. In this case, different ones of the multiple report triggering criterions represent different respective ranges of a certain measurement quantity. In one or more of these embodiments, the signaling indicates different measurement identities associated with different ones of the multiple report triggering criterions.

In some embodiments, the signaling is received while the wireless device is in a Radio Resource Control, RRC, connected state. Additionally or alternatively, the measurements on the one or more report triggering measurement objects are to be performed while the wireless device is in an RRC connected state.

In some embodiments, the one or more report triggering measurement objects comprise one or more report logging triggering measurement objects and one or more report sending triggering measurement objects. In this case, the one or more report logging triggering measurement objects are one or more objects of measurements whose results are to be evaluated by the wireless device for determining whether to log the measurement report, and wherein the one or more report sending triggering measurement objects are one or more objects of measurements whose results are to be evaluated by the wireless device for determining whether to send the measurement report. The method further comprises performing measurements on the one or more report logging triggering measurement objects, and evaluating whether or not report logging criteria is met, based on results of the measurements performed on the one or more report logging triggering measurement objects. The method further comprises, based on the report logging criteria being met, logging the measurement report, and performing measurements on the one or more report sending triggering measurement objects. The method further comprises, evaluating whether or not report sending criteria is met, based on results of the measurements performed on the one or more report sending triggering measurement objects, and sending or not sending the measurement report depending on whether or not the report sending criteria is met.

Other embodiments herein include a method performed by a network node configured for use in a wireless communication network. The method comprises transmitting, to a wireless device, signaling that indicates one or more report triggering measurement objects and one or more report content measurement objects. The one or more report triggering measurement objects are one or more objects of measurements whose results are to be evaluated by the wireless device for determining whether to log or send a measurement report. The one or more report content measurement objects are one or more objects of measurements whose results are to be reported by the measurement report. In some embodiments, the signaling is configurable to indicate at least one report content measurement object that is different from each of the one or more report triggering measurement objects indicated by the signaling.

In some embodiments, the method further comprises receiving the measurement report from the wireless device. In one or more of these embodiments, the method further comprises training, based on the received measurement report, a model that models a relation between one or more radio characteristics on the one or more report content measurement objects and one or more radio characteristics on the one or more report triggering measurement objects. In one or more of these embodiments, the method further comprises predicting, based on the model and one or more radio characteristics of the one or more report triggering measurement objects, one or more radio characteristics on the one or more report content measurement objects. In one or more of these embodiments, the method further comprises making a mobility decision for the same or a different wireless device based on said predicting. In one or more of these embodiments, the method further comprises selecting the one or more report content measurement objects based on an evaluation of a performance of the model. Additionally or alternatively, the method further comprises selecting the one or more report triggering measurement objects based on an evaluation of a performance of the model.

In some embodiments, the method further comprises selecting the one or more report content measurement objects based on one or more of receiving signaling indicating detection of the one or more report content measurement objects and a number of reports previously received that report measurements on the one or more report content measurement objects.

In some embodiments, at least one report content measurement object indicated by the signaling is different from each of the one or more report triggering measurement objects indicated by the signaling.

In some embodiments, the signaling includes a report triggering measurement object information element that indicates the one or more report triggering measurement objects and includes a report content measurement object information element that indicates the one or more report content measurement objects.

In some embodiments, the signaling indicates one or more report triggering criterions that the wireless device is to evaluate using the results of the measurements on the one or more report triggering measurement objects, and one or more quantities to be reported by the measurement report as the results of the measurements on the one or more report content measurement objects. In one or more of these embodiments, the signaling includes a report triggering configuration information element that indicates the one or more report triggering criterions, and includes a report content configuration information element that indicates the one or more quantities.

In some embodiments, at least one of the one or more report triggering measurement objects is associated with multiple report triggering criterions. In this case, different ones of the multiple report triggering criterions represent different respective ranges of a certain measurement quantity. In one or more of these embodiments, the signaling indicates different measurement identities associated with different ones of the multiple report triggering criterions. In some embodiments, the signaling is transmitted while the wireless device is in a Radio Resource Control, RRC, connected state. Additionally or alternatively, the measurements on the one or more report triggering measurement objects are to be performed while the wireless device is in an RRC connected state.

In some embodiments, the one or more report triggering measurement objects comprise one or more report logging triggering measurement objects and one or more report sending triggering measurement objects. The one or more report logging triggering measurement objects are one or more objects of measurements whose results are to be evaluated by the wireless device for determining whether to log the measurement report, and the one or more report sending triggering measurement objects are one or more objects of measurements whose results are to be evaluated by the wireless device for determining whether to send the measurement report.

Other embodiments herein include a wireless device configured for use in a wireless communication network. The wireless device is configured to receive, from a network node in the wireless communication network, signaling that indicates one or more report triggering measurement objects and one or more report content measurement objects. The one or more report triggering measurement objects are one or more objects of measurements whose results are to be evaluated by the wireless device for determining whether to log or send a measurement report. The one or more report content measurement objects are one or more objects of measurements whose results are to be reported by the measurement report, and the signaling is configurable to indicate at least one report content measurement object that is different from each of the one or more report triggering measurement objects indicated by the signaling.

In some embodiments, the wireless device is configured to perform the steps described above for a wireless device.

Other embodiments herein include a network node configured for use in a wireless communication network. The network node is configured to transmit, to a wireless device, signaling that indicates one or more report triggering measurement objects and one or more report content measurement objects. The one or more report triggering measurement objects are one or more objects of measurements whose results are to be evaluated by the wireless device for determining whether to log or send a measurement report. The one or more report content measurement objects are one or more objects of measurements whose results are to be reported by the measurement report, and the signaling is configurable to indicate at least one report content measurement object that is different from each of the one or more report triggering measurement objects indicated by the signaling.

In some embodiments, the network node is configured to perform the steps described above for a network node.

Other embodiments herein include a computer program comprising instructions which, when executed by at least one processor of a wireless device, causes the wireless device to perform the steps described above for a wireless device. Other embodiments herein include a computer program comprising instructions which, when executed by at least one processor of a network node, causes the network node to perform the steps described above for a network node. In one or more of these embodiments, a carrier containing the computer program is one of an electronic signal, optical signal, radio signal, or computer readable storage medium.

Other embodiments herein include a wireless device configured for use in a wireless communication network. The wireless device comprises communication circuitry and processing circuitry. The processing circuitry is configured to receive, via the communication circuitry, from a network node in the wireless communication network, signaling that indicates one or more report triggering measurement objects and one or more report content measurement objects. The one or more report triggering measurement objects are one or more objects of measurements whose results are to be evaluated by the wireless device for determining whether to log or send a measurement report. The one or more report content measurement objects are one or more objects of measurements whose results are to be reported by the measurement report, and the signaling is configurable to indicate at least one report content measurement object that is different from each of the one or more report triggering measurement objects indicated by the signaling.

In some embodiments, the processing circuitry is configured to perform the steps described above for a wireless device.

Other embodiments herein include a network node configured for use in a wireless communication network. The network node comprises communication circuitry and processing circuitry. The processing circuitry is configured to transmit, via the communication circuitry, to a wireless device, signaling that indicates one or more report triggering measurement objects and one or more report content measurement objects. The one or more report triggering measurement objects are one or more objects of measurements whose results are to be evaluated by the wireless device for determining whether to log or send a measurement report. The one or more report content measurement objects are one or more objects of measurements whose results are to be reported by the measurement report, and the signaling is configurable to indicate at least one report content measurement object that is different from each of the one or more report triggering measurement objects indicated by the signaling.

In some embodiments, the processing circuitry is configured to perform the steps described above for a network node.

Embodiments herein moreover include corresponding apparatus, computer programs, and carriers of those computer programs.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
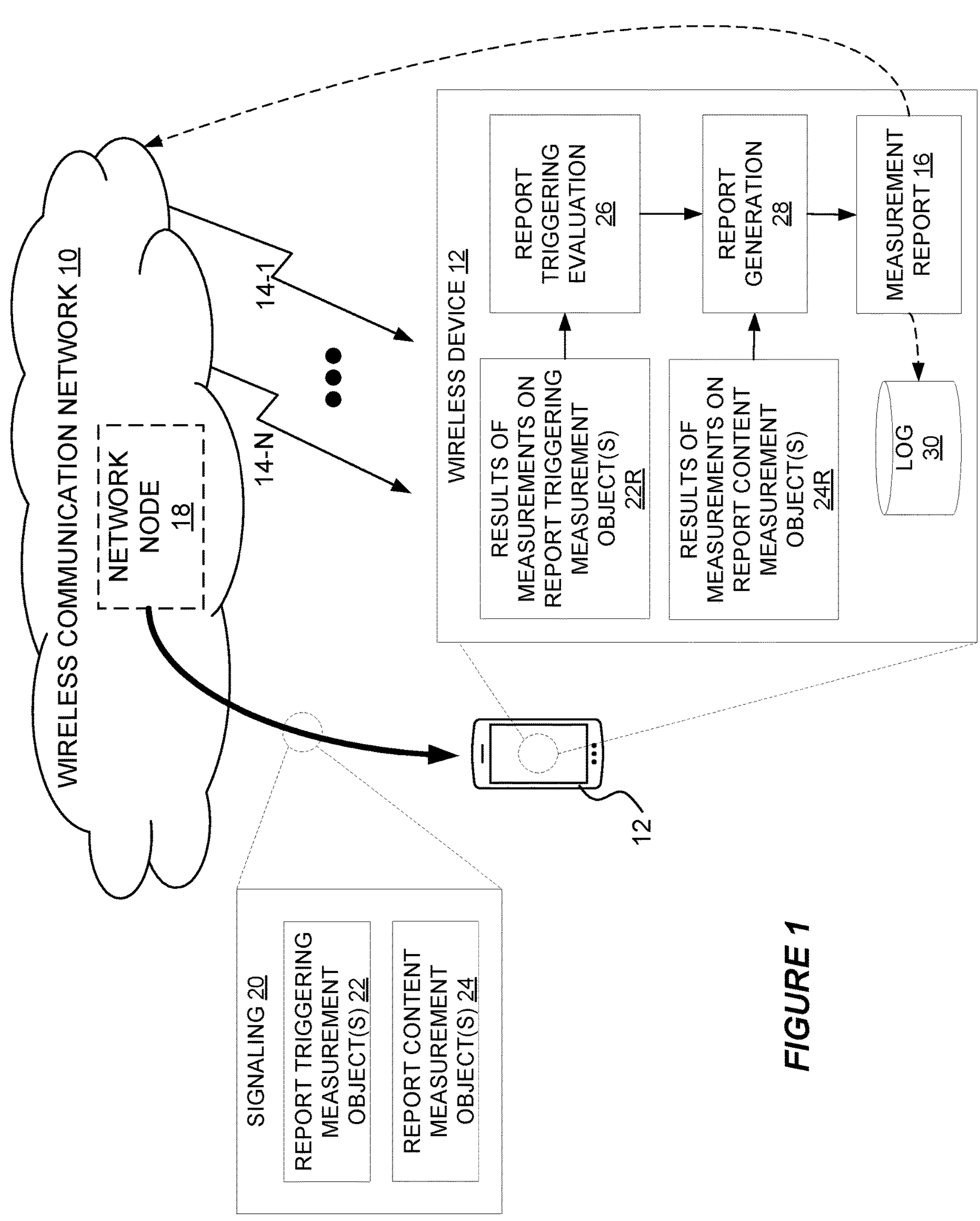
FIG. 1 is a block diagram of a wireless communication network according to some embodiments.

FIG. 1 shows a wireless communication network 10 according to some embodiments. The wireless communication network 10 provides wireless communication service to a wireless device 12.

The wireless device 12 is configurable to perform measurements on one or more so-called measurement objects 14-1 . . . 14-N. A measurement object in this sense may be a single carrier frequency, a set of one or more carrier frequencies, a set of one or more cells, a set of one or more network identifiers (e.g., Wireless Local Area Network, WLAN, identifiers), a set of one or more transmission resource pools, or any other object on which a signal measurement may be performed. The measurements on such objects 14-1 . . . 14-N may, for example, be signal strength measurements, signal quality measurements, or the like. The measurements may be performed while the wireless device 12 is in a Radio Resource Control (RRC) connected state. Regardless, the wireless device 12 is furthermore configurable to generate a measurement report which reports the results of measurements that the wireless device 12 performs. This measurement report can be logged at the wireless device 12 and/or sent to the network 10.

More particularly in this regard, FIG. 1 shows a network node 18 in the wireless communication network 10 which configures the wireless device 12 to perform measurement reporting. Towards this end, the network node 18 transmits signaling 20 to the wireless device 12, e.g., in the form of RRC signaling received while the wireless device 12 is in an RRC connected state. The signaling 20 indicates one or more so-called report triggering measurement objects 22 and one or more so-called report content measurement objects 24. The one or more report triggering measurement objects 22 are one or more objects of measurements whose results are to be evaluated by the wireless device 12 for determining whether to log or send a measurement report 16. The one or more report content measurement objects 24 are one or more objects of measurements whose results are to be reported by the measurement report 16.

Accordingly, the wireless device 12 as shown may perform measurements on the one or more report triggering measurement objects 22. Based on the results 22R of those measurements, the wireless device 12 performs report triggering evaluation 26 to evaluate whether or not to send (or simply log) the measurement report 16. This evaluation 26 will trigger the wireless device 12 to either send/log the measurement report 16, or to refrain from sending/logging the measurement report 16.

If the evaluation 26 triggers the wireless device 12 to send or log the measurement report 16, the wireless device 12 performs report generation 28 to generate the measurement report 16. Notably, the wireless device 12 generates the measurement report 16 to report the results of measurements that the wireless device 16 performs on the one or more report content measurement objects 24, as distinguished from the one or more report triggering measurement objects 22. The one or more report content measurement objects 24 in this regard may be configured to be different than the one or more report triggering measurement objects 22.

Figure 2:
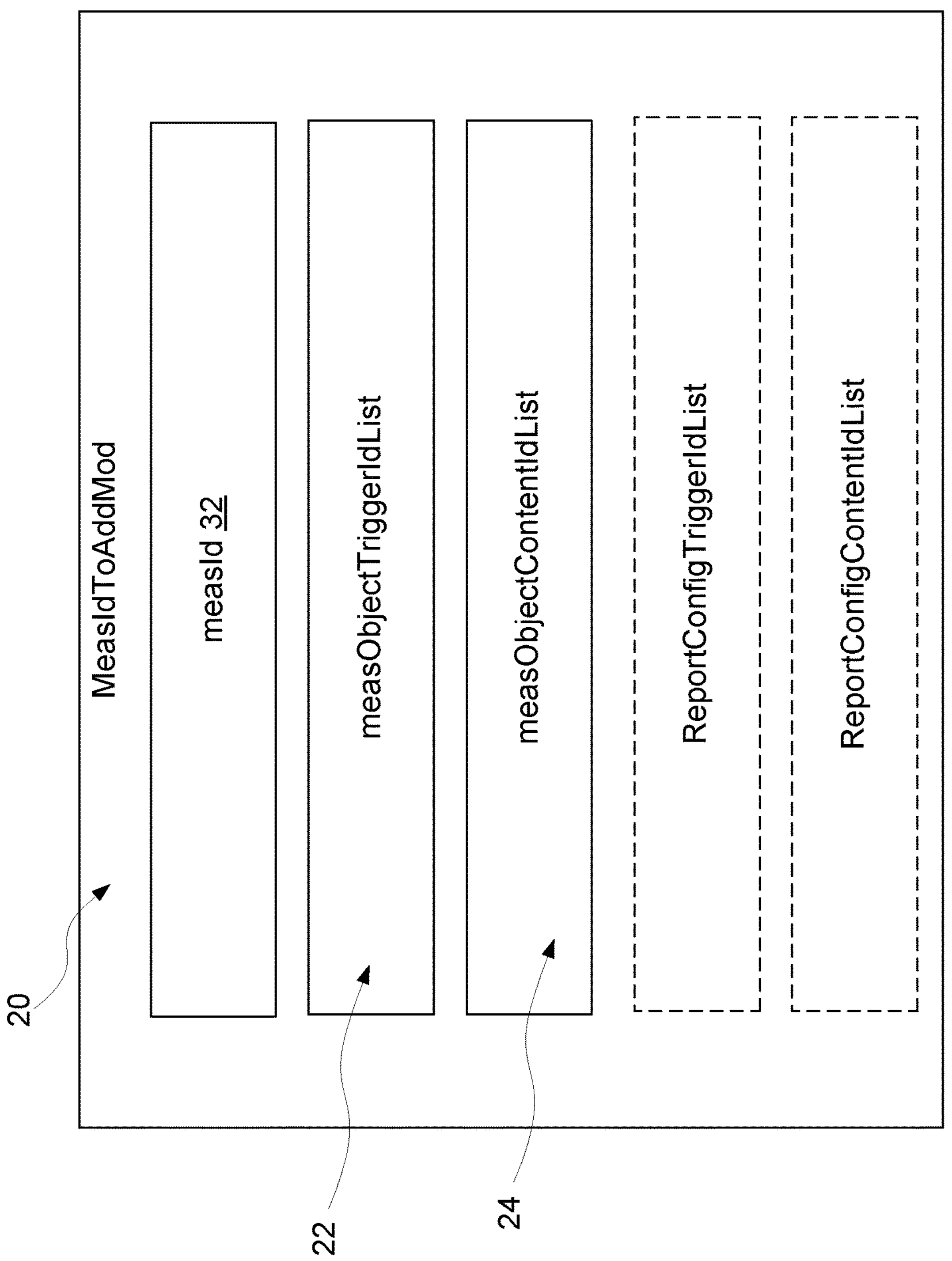
FIG. 2 is a block diagram of signaling according to some embodiments where one information element indicates report triggering measurement object(s) and a separate information element indicates the report content measurement object(s).

The measurement objects 22, 24 may be different in the sense that they are mutually exclusive, e.g., no report content measurement object 24 is the same as any of the report triggering measurement object(s) 22. Or, the measurement objects 22, 24 may be different in the sense that at least one of the one or more report content measurement objects 24 may be configured to be different from each of the one or more report triggering measurement objects 22. Indeed, the signaling 20 in some embodiments is configurable to indicate at least one report content measurement object 24 that is different from each of the one or more report triggering measurement objects 22 indicated by the signaling 20. The signaling 20 may for example indicate the one or more report triggering measurement objects 22 separately or independently from indicating the one or more report content measurement objects 24. FIG. 2 shows one example of such signaling 20 in embodiments where one information element indicates the report triggering measurement object(s) 22 and a separate information element indicates the report content measurement object(s) 24.

As shown in FIG. 2, the signaling 20 takes the form of a MeasIdToAddMod information element (IE), e.g., as included in an RRC message. This measIdToAddMod IE includes a measObjectTriggerIdList IE that is a list of one or more identities which respectively identify the one or more report triggering measurement objects 22. The measIdToAddMod IE also includes a separate measObjectContetIdList IE that is a list of one or more identities which respectively identify the one or more report content measurement objects 24. By including separate lists for the report triggering measurement object(s) 22 and the report content measurement object(s) 24, rather than a single list of measurement objects, the measIdToAddMod IE allows configuration of at least one report content measurement object 24 that is different from each of the report triggering measurement object(s) 22.

In an example from FIG. 1, then, the network node 18 in these and other embodiments may transmit signaling 20 that indicates measurement object 14-1 as a report triggering measurement object 22 and that indicates measurement object 14-2 as a report content measurement object 24. The signaling 20 does not indicate measurement object 14-1 as a report content measurement object 24. Nor does the signaling 20 indicate measurement object 14-2 as a report triggering measurement object 22. Accordingly, the wireless device 12 evaluates the results of measurements on measurement object 14-1 in order to determine whether to log or send a measurement report 16. Because measurement object 14-2 was not indicated as a report triggering measurement object 22, the wireless device's evaluation of whether to log or send the measurement report 16 does not depend on the results of measurements on that measurement object 14-2. If the wireless device 12 logs or sends the measurement report 16 according to its evaluation, the measurement report 16 reports the results of measurements on measurement object 14-2. Because measurement object 14-1 was not indicated as a report content measurement object 24, the measurement report 16 does not report the results of measurements on measurement object 14-1. The measurement report 16 therefore is triggered based on the results of measurements on measurement object 14-1 but reports the results of measurement on measurement object 14-2.

In some embodiments, the signaling 20 also indicates one or more report triggering criterions that the wireless device 12 is to evaluate using the results of the measurements on the one or more report triggering measurement objects 22. The report triggering criterion(s) may for example correspond to certain event(s) occurring with respect to the results of the measurements on the one or more report triggering measurement objects 22, e.g., where one example event may be the result of measurement on a report triggering measurement object exceeding a certain threshold. Regardless, the signaling 20 may specifically associate the one or more report triggering criterions with the one or more report triggering measurement objects 22. That is, the one or more report triggering criterions are not associated with the one or more report content measurement objects 24. Instead, the signaling 20 may alternatively or additionally indicate one or more quantities to be reported by the measurement report 16 as the results of the measurements on the one or more report content measurement objects 24. The signaling 20 may for instance include a report triggering configuration information element (IE) that indicates the one or more report triggering criterions, and include a report content configuration IE that indicates the one or more quantities to be reported. FIG. 2 shows one example of this.

As shown in FIG. 2, the MeasIdToAddMod IE in these embodiments includes a ReportConfigTriggerIdList and a ReportConfigContentIdList. The ReportConfigTriggerIdList indicates the one or more report triggering criterions, whereas the ReportConfigContentIdList indicates the one or more quantities. More particularly, the ReportConfigTriggerIdList is a list of one or more reporting configuration identities which identify one or more respective reporting configurations, where each reporting configuration indicates one or more report triggering criterions. And, the ReportConfigContentIdList is a list of one or more reporting configuration identities which identify one or more respective reporting configurations, where each reporting configuration indicates one or more quantities to be reported. As shown in this example, the signaling 20 in the form of the MeasIdToAddMod IE may also include a measurement identity (measId) 32 to add or modify at the wireless device 12. The measurement identity 32 is used as a reference number in the measurement report 16. The measurement identity 32 in the MeasIdToAddMod IE links the measObjectTriggerIdList and measObjectContentIdList to the ReportCOnfigTriggerIdList and ReportConfigContentIdList. In other embodiments, though, the signaling 20 may indicate different measurement identities associated with different ones of multiple report triggering criterions. In one such embodiment, for instance, at least one of the one or more report triggering measurement objects 22 is associated with multiple report triggering criterions, where different ones of the multiple report triggering criterions represent different respective ranges of a certain measurement quantity.

In any event, separate configuration of the report triggering measurement object(s) 22 and the report content measurement object(s) 24 advantageously allows the object(s) of measurements whose results are to be reported in the measurement report 16 to be different from each of the object(s) of measurements whose results are to trigger the measurement report 16. Accordingly, in some embodiments, the network 10 can flexibly configure the measurement report 16 to report the results of measurements on any measurement object, irrespective of whether the measurement report 16 was triggered by the results of measurements on that same measurement object.

In these and other embodiments, the wireless communication network 10 may exploit the measurement report 16 for realizing enhanced functionality. The network node 18 may for example receive the measurement report 16 from the wireless device 12 and perform one or more actions based on that measurement report 16. The one or more actions may for example include making a mobility decision for the same or a different wireless device.

In some embodiments, for example, the network node 18 maintains a model that models a relation between one or more radio characteristics on the one or more report content measurement objects 24 and one or more radio characteristics on the one or more report triggering measurement objects 22. In this case, the network node 18 may train this model based on the received measurement report 16, since the measurement report 16 reports the results of measurements on the one or more report content measurement objects 24 and was triggered based on the results of measurements on the one or more report triggering measurement objects 22. In any event, after training the model, the network node 18 may use the trained model to make predictions about the radio characteristics on the one or more report content measurement objects 24, e.g., to support mobility management decisions. For instance, the network node 18 may later on predict, based on the model and one or more radio characteristics of the one or more report triggering measurement objects 22, one or more radio characteristics on the one or more report content measurement objects 24. The network node 18 may then make a mobility decision for the same or a different wireless device based on that prediction.

Figure 3B:
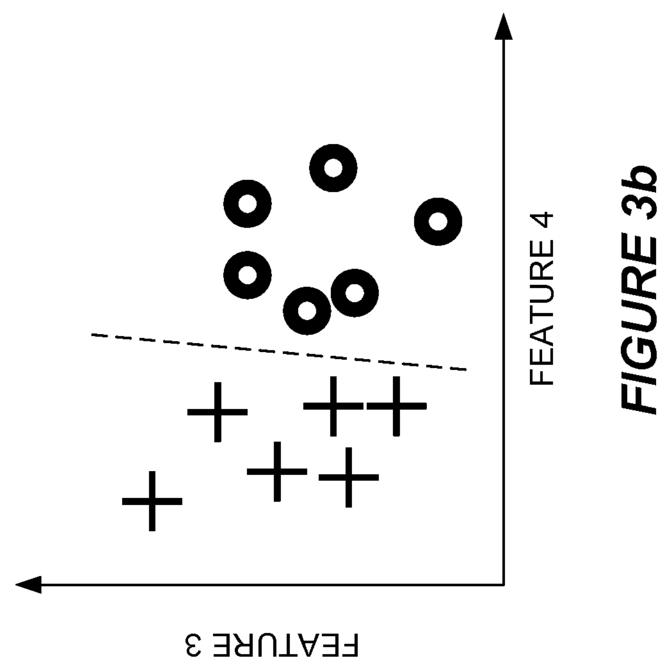
FIGS. 3*a*-3*b* are charts showing an example of one type of machine learning, namely classification, according to some embodiments.
Figure 3A:
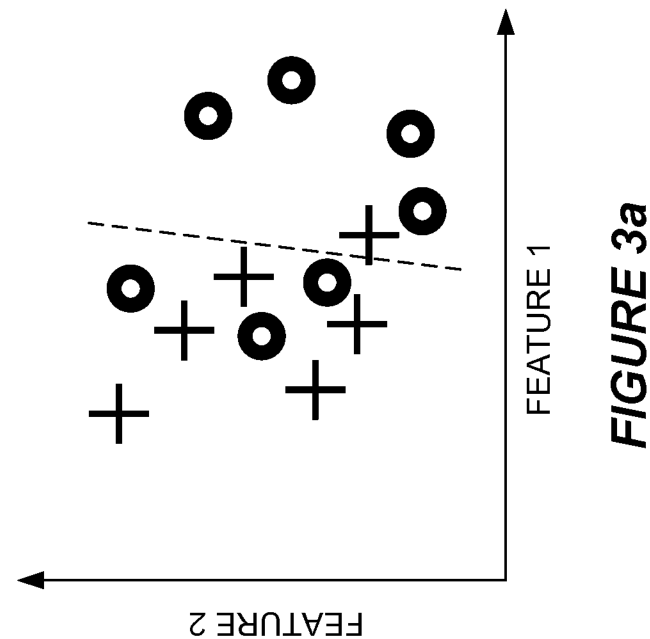

The network node 18 in some embodiments makes this prediction as part of machine learning. In particular, machine learning can be used to find a predictive function for a given dataset; the dataset is typically a mapping between a given input to an output. The predictive function (or mapping function) is generated in a training phase, where the training phase assumes knowledge of both the input and output. The test phase comprises predicting the output for a given input. Applications of machine learning are for example curve fitting, facial recognition and spam filter. FIGS. 3*a*-3*b* shows an example of one type of machine learning, namely classification, where the task is to train a predictive function that separates the two classes (circle and cross class). In FIG. 3*a*, feature 1 and 2 provides low separation of the output class, hence leading to a worse prediction performance in comparison with FIG. 3*b*. Using feature 3 and 4 therefore enables a better separation and classifying performance. In general, the performance of the machine learner is proportional to the correlation between the input and the output. One problem in machine learning is to find/create good features, whereas another problem is to collect enough data samples.

Some embodiments exploit the measurement reporting configuration described above to perform classification in a radio context. In particular, some embodiments exploit the measurement reporting configuration described above to predict the coverage on a frequency different from the serving frequency (also referred to as secondary or non-serving frequency), based on measurements on the serving frequency. In such an example where the measurement objects 22, 24 are frequencies, the network node 18 may predict the coverage on a measurement report content object 24 (e.g., a non-serving frequency), based on the results of measurements on a measurement report triggering object 22 (e.g., a serving frequency). In particular, the network node 18 may predict the Reference Signal Received Power (RSRP) of a secondary frequency based on the RSRP, timing advance (TA), and precoder index of cells on a serving frequency (including neighbor cells). The network node 18 collects data for this prediction through measurement reports, through specific combinations of events such as A2 or A5 events, and/or through inter-frequency measurement reports. In any event, once the network node 18 trains its machine learning (ML) model, the model is able to output an estimate of coverage for different frequencies, for new input data, which can be utilized in different ways such as in mobility to filter out relevant frequency candidates.

Figure 4:
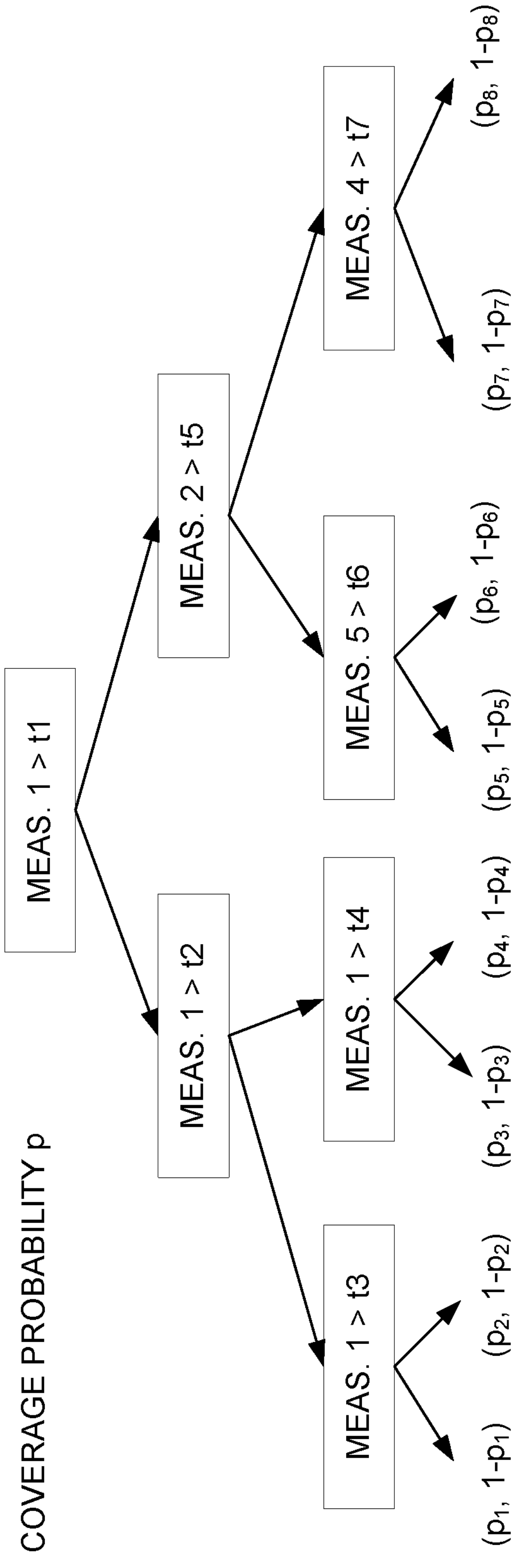
FIG. 4 is a block diagram of a decision tree for predicting coverage probability according to some embodiments.

FIG. 4 shows one example where the network node 18 trains a decision tree for predicting the coverage probability p on another carrier given 5 different measurements on the source carrier, e.g., a primary (first) carrier. The measurement could represent an RSRP or Reference Signal Received Quality (RSRQ) measurement of the serving or neighboring cell in a Long Term Evolution (LTE) context, or an RSRP/RSRQ beam measurement in a New Radio (NR) context. The coverage probability is denoted by p, and no coverage is naturally defined as (1-p). Note that each leaf node will provide a different coverage probability p (p1-p8). The decision tree is usable to predict the coverage probability p on another carrier, given measurements 1-5 on a primary (first) carrier.

In this context, some embodiments enable the network node 18 to collect more inter-frequency measurements in order to build mappings between different frequencies, e.g., for training a decision tree. This may improve inter-frequency handover performance. In fact, in some embodiments, the network node 18 exploits embodiments herein to collect inter-frequency measurements in problematic regions of intra-frequency coverage, e.g., at the intra-frequency coverage edge and/or intra-frequency cell edge with high interference. This way, the network node 18 may receive inter-frequency measurements when a wireless device is in a bad coverage region, e.g., triggered by intra-frequency measurement events. Upon receiving the inter-frequency measurements, then, the network node 18 may perform a handover decision to another frequency.

Figure 5:
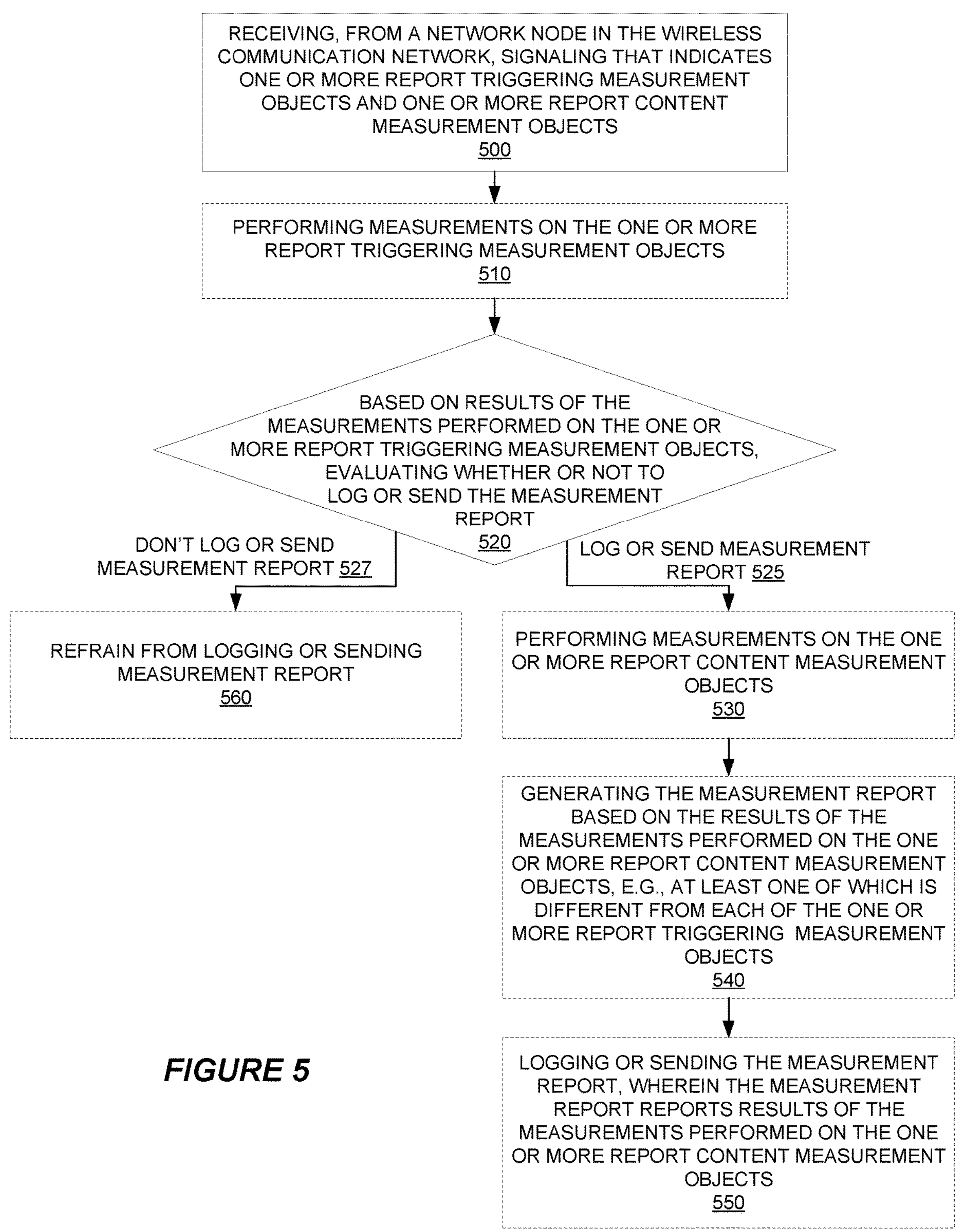
FIG. 5 is a logic flow diagram of a method performed by a wireless device configured for use in a wireless communication network in accordance with particular embodiments.

In view of the above modifications and variations, FIG. 5 depicts a method performed by a wireless device 12 configured for use in a wireless communication network 10 in accordance with particular embodiments. The method includes receiving, from a network node 18 in the wireless communication network 10, signaling 20 that indicates one or more report triggering measurement objects 22 and one or more report content measurement objects 24 (Block 500). The one or more report triggering measurement objects 22 are one or more objects of measurements whose results are to be evaluated by the wireless device 12 for determining whether to log or send a measurement report 16. The one or more report content measurement objects 24 are one or more objects of measurements whose results are to be reported by the measurement report 16. In some embodiments, the signaling 20 is configurable to indicate at least one report content measurement object 24 that is different from each of the one or more report triggering measurement objects 22 indicated by the signaling 20. In one such embodiment, for example, the signaling 20 indicates the one or more report triggering measurement objects 22 separately from indicating the one or more report content measurement objects 24.

In some embodiments, the method further comprises performing measurements on the one or more report triggering measurement objects 22 (Block 510). The method may also comprise, based on results of the measurements performed on the one or more report triggering measurement objects 22, evaluating whether or not to log or send the measurement report 16 (Block 520). The wireless device 12 may be configured to log or send the measurement report 16, or to refrain from logging or sending the measurement report 16, depending on that evaluation.

In this regard, if the wireless device 12 determines to not log or send the measurement report 16 according to the evaluation (Step 527), the method comprises refraining from logging or sending the measurement report 16 (Block 560). On the other hand, if the wireless device 12 determines to log or send the measurement report 16 according to the evaluation (Step 525), the method may further include performing measurements on the one or more report content measurement objects 24 (if not already performed in advance) (Block 530). The method may also include generating the measurement report 16 based on the results of the measurements performed on the one or more report content measurement objects 24 (Block 540). In some embodiments, for example, at least one of these one or more report content measurement objects 24 is different from each of the one or more report triggering measurement objects 22. Having generated the measurement report 16, the method may also comprise logging or sending the measurement report 16 (Block 550). The measurement report 16 may therefore report results of the measurements performed on the one or more report content measurement objects 24, e.g., without reporting any or all of the results of the measurements performed on the one or more report triggering measurement objects 22.

Figure 6:
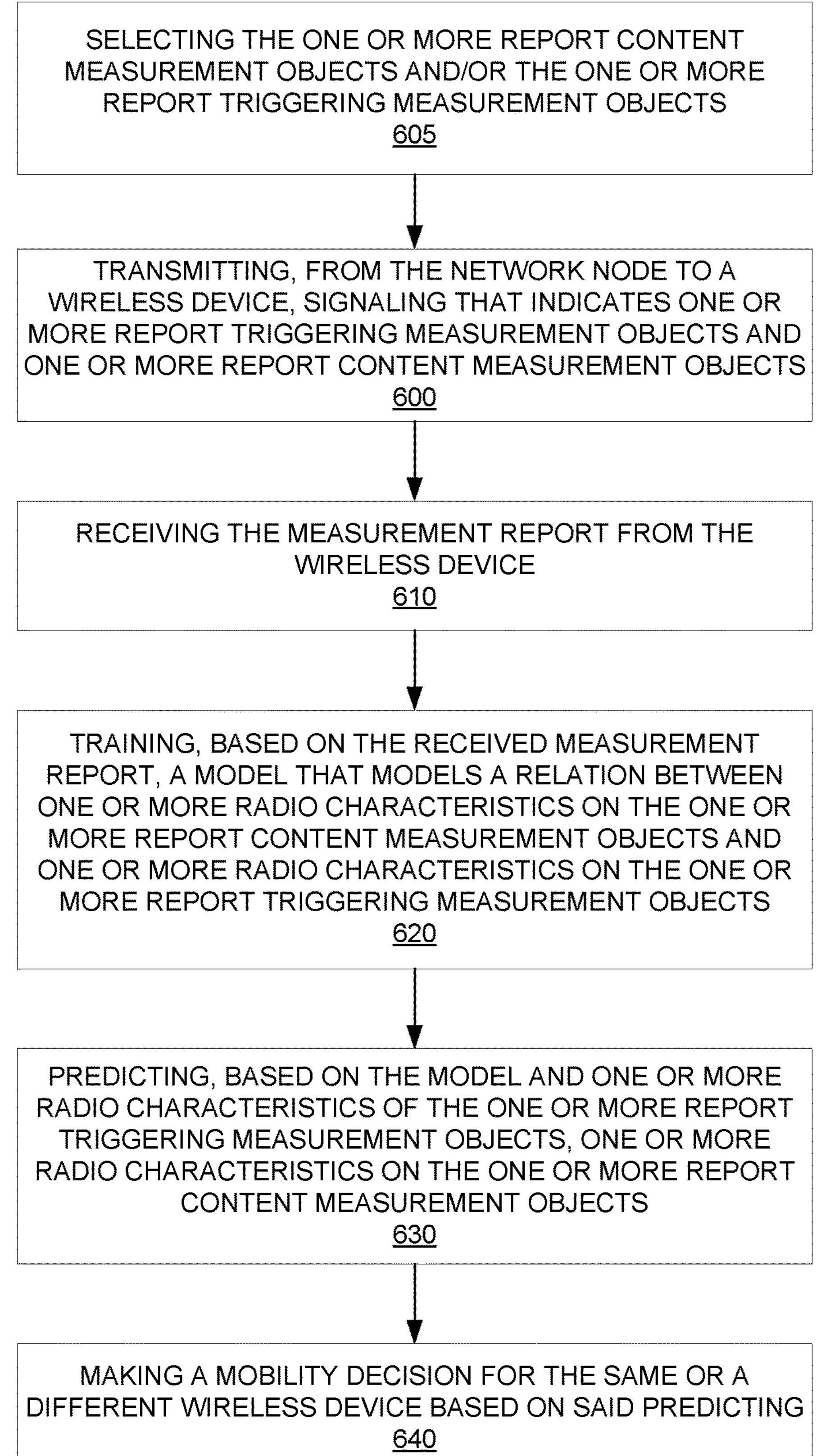
FIG. 6 is a logic flow diagram of a method performed by a network node configured for use in a wireless communication network in accordance with other particular embodiments.

FIG. 6 depicts a method performed by a network node 18 configured for use in a wireless communication network 10 in accordance with other particular embodiments. The method includes transmitting, from the network node 18 to a wireless device 12, signaling 20 that indicates one or more report triggering measurement objects 22 and one or more report content measurement objects 24 (Block 600). The one or more report triggering measurement objects 22 are one or more objects of measurements whose results are to be evaluated by the wireless device 12 for determining whether to log or send a measurement report 16. The one or more report content measurement objects 24 are one or more objects of measurements whose results are to be reported by the measurement report 16. In some embodiments, the signaling 20 is configurable to indicate at least one report content measurement object 24 that is different from each of the one or more report triggering measurement objects 22 indicated by the signaling 20. In one such embodiment, for example, the signaling 20 indicates the one or more report triggering measurement objects 22 separately from indicating the one or more report content measurement objects 24.

In some embodiments, the method further comprises receiving the measurement report 16 from the wireless device 12 (Block 610).

In some embodiments, the method further comprises training, based on the received measurement report 16, a model that models a relation between one or more radio characteristics on the one or more report content measurement objects 24 and one or more radio characteristics on the one or more report triggering measurement objects 22 (Block 620). The method may further include predicting, based on the model and one or more radio characteristics of the one or more report triggering measurement objects 22, one or more radio characteristics on the one or more report content measurement objects 24 (Block 630). The method may additionally include making a mobility decision for the same or a different wireless device based on said predicting (Block 640).

In some embodiments, the method further comprises selecting the one or more report content measurement objects and/or the one or more report triggering measurement objects, e.g., based on an evaluation of a performance of the model (Block 605).

Embodiments herein also include corresponding apparatuses. Embodiments herein for instance include a wireless device configured to perform any of the steps of any of the embodiments described above for the wireless device.

Embodiments also include a wireless device 12 comprising processing circuitry and power supply circuitry. The processing circuitry is configured to perform any of the steps of any of the embodiments described above for the wireless device 12. The power supply circuitry is configured to supply power to the wireless device 12.

Embodiments further include a wireless device 12 comprising processing circuitry. The processing circuitry is configured to perform any of the steps of any of the embodiments described above for the wireless device 12. In some embodiments, the wireless device 12 further comprises communication circuitry.

Embodiments further include a wireless device 12 comprising processing circuitry and memory. The memory contains instructions executable by the processing circuitry whereby the wireless device 12 is configured to perform any of the steps of any of the embodiments described above for the wireless device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 12. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a network node 18 configured to perform any of the steps of any of the embodiments described above for the network node 18.

Embodiments also include a network node 18 comprising processing circuitry and power supply circuitry. The processing circuitry is configured to perform any of the steps of any of the embodiments described above for the network node 18. The power supply circuitry is configured to supply power to the network node 18.

Embodiments further include a network node 18 comprising processing circuitry. The processing circuitry is configured to perform any of the steps of any of the embodiments described above for the network node 18. In some embodiments, the network node 18 further comprises communication circuitry.

Embodiments further include a network node 18 comprising processing circuitry and memory. The memory contains instructions executable by the processing circuitry whereby the network node 18 is configured to perform any of the steps of any of the embodiments described above for the network node 18.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
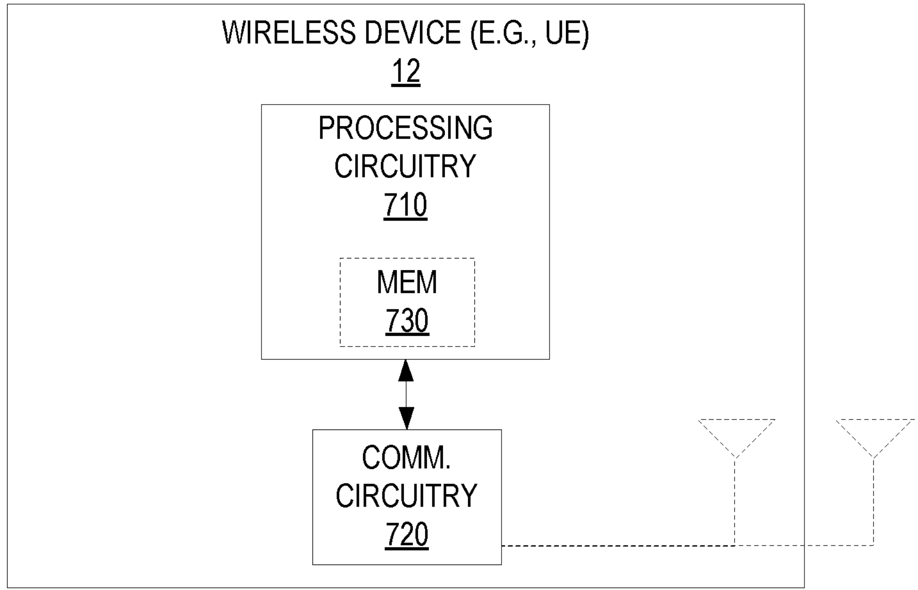
FIG. 7 is a block diagram of a wireless device configured for use in a wireless communication network in accordance with particular embodiments.

FIG. 7 for example illustrates a wireless device 12 as implemented in accordance with one or more embodiments. As shown, the wireless device 12 includes processing circuitry 710 and communication circuitry 720. The communication circuitry 720 (e.g., radio circuitry) is configured to transmit and/or receive information to and/or from one or more other nodes, e.g., via any communication technology. Such communication may occur via one or more antennas that are either internal or external to the wireless device 12. The processing circuitry 710 is configured to perform processing described above, e.g., in FIG. 5, such as by executing instructions stored in memory 730. The processing circuitry 710 in this regard may implement certain functional means, units, or modules.

Figure 8:
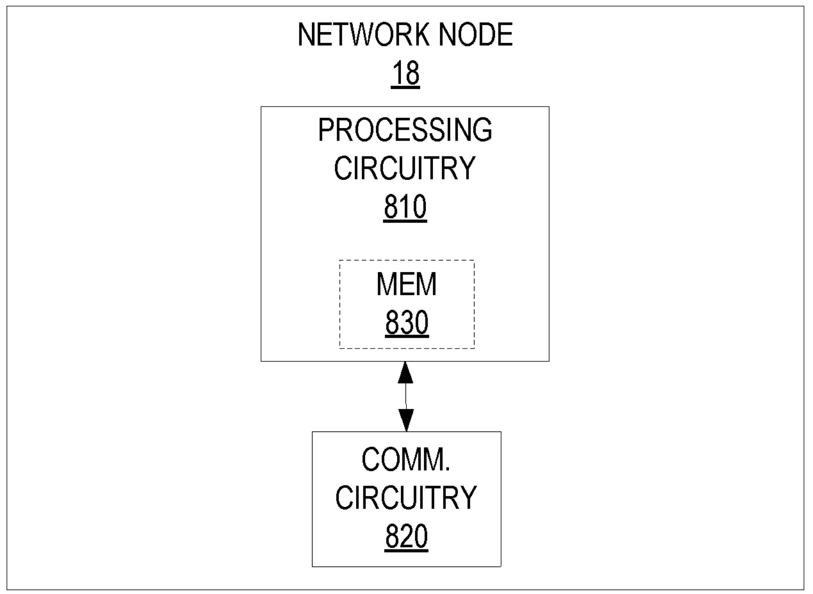
FIG. 8 is a block diagram of a network node configured for use in a wireless communication network in accordance with other particular embodiments.

FIG. 8 illustrates a network node 18 as implemented in accordance with one or more embodiments. As shown, the network node 18 includes processing circuitry 810 and communication circuitry 820. The communication circuitry 820 is configured to transmit and/or receive information to and/or from one or more other nodes, e.g., via any communication technology. The processing circuitry 810 is configured to perform processing described above, e.g., in FIG. 6, such as by executing instructions stored in memory 830. The processing circuitry 810 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In some of the below embodiments, the wireless device 12 is exemplified as a user equipment (UE), and the network node 18 is exemplified as a network node.

Consider some embodiments as applicable to mobility in RRC_CONNECTED in Long Term Evolution (LTE) and New Radio (NR). An RRC_CONNECTED user equipment (UE) in LTE (also called EUTRA) can be configured by the network to perform measurements. Upon triggering measurement reports, the network may send a handover command to the UE (in LTE an RRCConnectionReconfiguration with a field called mobilityControlInfo and in NR an RRCReconfiguration with a reconfigurationWithSync field). These reconfigurations are actually prepared by the target cell upon a request from the source node (over X2 interface in case of EUTRA-EPC or Xn interface in case of EUTRA-5GC or NR) and take into account the existing RRC configuration the UE has with the source cell (which are provided in the inter-node request). Among other parameters, that reconfiguration provided by the target cell contains all of the information that the UE needs to access the target cell, e.g., random access configuration, a new Cell Radio Network Temporary Identity (C-RNTI) assigned by the target cell and security parameters enabling the UE to calculate new security keys associated to the target cell so the UE can send a handover complete message on Signaling Radio Bearer #1 (SRB1) (encrypted and integrity protected) based on new security keys upon accessing the target cell.

Figure 9A:
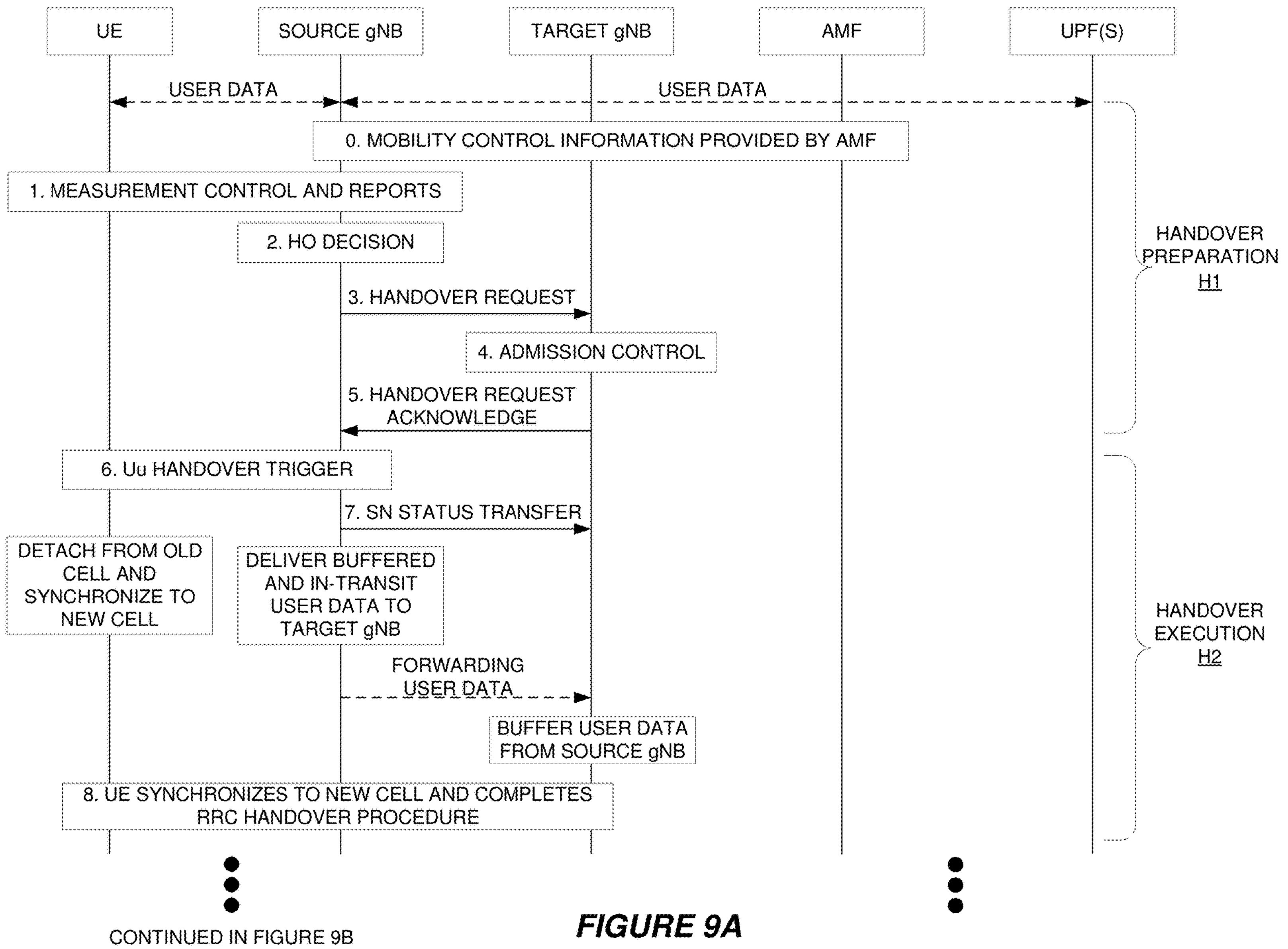
FIGS. 9A-9B are call flow diagrams of signalling between a user equipment, source node and target node during a handover procedure according to some embodiments.
Figure 9B:
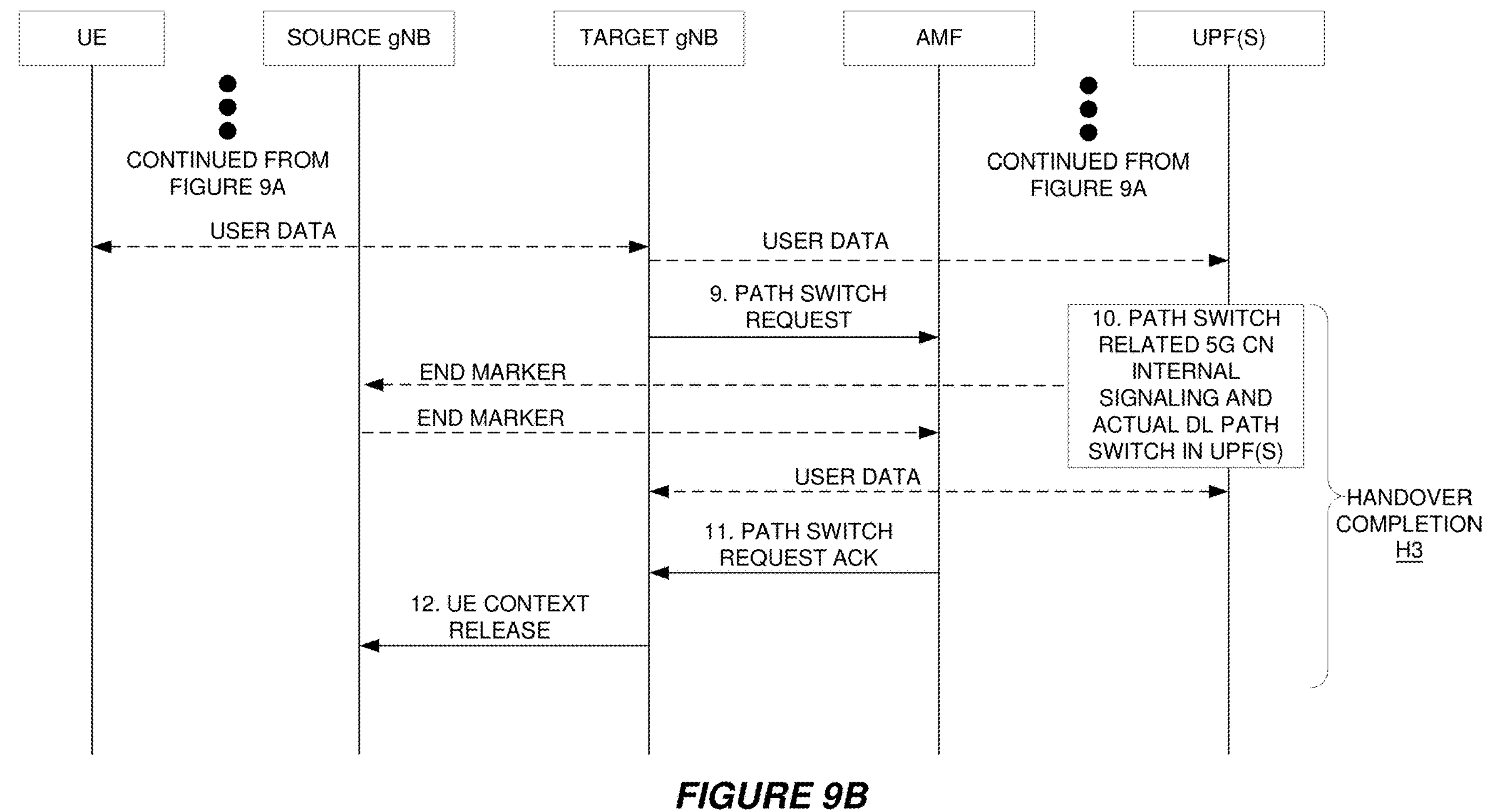
Figure 9B:
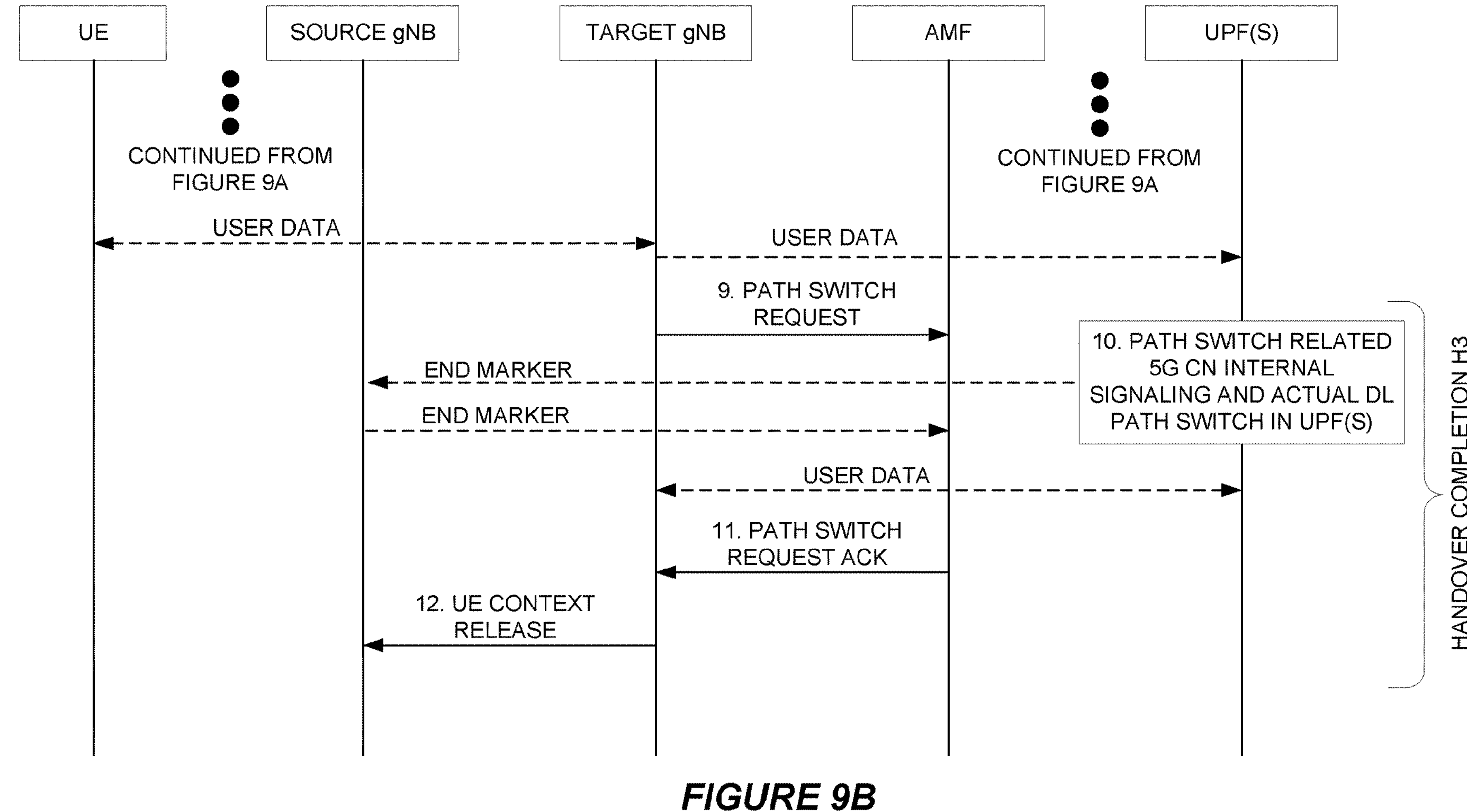

FIGS. 9A-9B summarize the flow signalling between UE, source node and target node during a handover procedure.

As shown, the UE may be transmitting user data to and/or receiving user data from User Plane Function(s) via a source gNB. Handover preparation H1, handover execution H2, and handover completion H3 may thereafter proceed as follows.

Step 0. The UE context within the source gNB contains information regarding roaming and access restrictions which were provided either at connection establishment or at the last timing advance (TA) update.

Step 1. The source gNB configures the UE measurement procedures and the UE reports according to the measurement configuration.

Step 2. The source gNB decides to handover the UE, based on MeasurementReport and Radio Resource Management (RRM) information.

Step 3. The source gNB issues a Handover Request message to the target gNB passing a transparent RRC container with necessary information to prepare the handover at the target side. The information includes at least the target cell ID, KgNB*, the Cell Radio Network Temporary Identity (C-RNTI) of the UE in the source gNB, RRM-configuration including UE inactive time, basic AS-configuration including antenna Info and DL Carrier Frequency, the current quality of service (QoS) flow to Data Radio Bearer (DRB) mapping rules applied to the UE, the System Information Block #1 (SIB1) from source gNB, the UE capabilities for different Radio Access Technologies (RATs), Protocol Data Unit (PDU) session related information, and can include the UE reported measurement information including beam-related information if available. The PDU session related information includes the slice information (if supported) and QoS flow level QoS profile(s).

Step 4. Admission Control may be performed by the target gNB. Slice-aware admission control shall be performed if the slice information is sent to the target gNB. If the PDU sessions are associated with non-supported slices the target gNB shall reject such PDU Sessions.

Step 5. The target gNB prepares the handover with L1/L2 and sends the HANDOVER REQUEST ACKNOWLEDGE to the source gNB, which includes a transparent container to be sent to the UE as an RRC message to perform the handover.

Step 6. The source gNB triggers the Uu handover by sending an RRCReconfiguration message to the UE, containing the information required to access the target cell: at least the target cell ID, the new C-RNTI, the target gNB security algorithm identifiers for the selected security algorithms. It can also include a set of dedicated Random Access Channel (RACH) resources, the association between RACH resources and Synchronization Signal Block(s) (SSB(s)), the association between RACH resources and UE-specific Channel State Information Reference Signal (CSI-RS) configuration(s), common RACH resources, and system information of the target cell, etc.

Step 7. The source gNB sends the SN STATUS TRANSFER message to the target gNB.

The UE may then detach from the old cell and synchronize to the new cell. The source gNB may deliver buffered and in-transit user data to the target gNB, by forwarding that user data to the target gNB. The target gNB may buffer this user data from the source gNB.

Step 8. The UE synchronises to the target cell and completes the RRC handover procedure by sending RRCReconfigurationComplete message to target gNB.

At this point, the UE may transmit user data to and/or receive user data from the target gNB, but the target gNB may only transmit user data to the user plane function(s) (UPF(s)). In order for the target gNB to be able to receive user data from the UPF(s) for the UE, the target gNB proceeds as follows.

Step 9. The target gNB sends a PATH SWITCH REQUEST message to an Access and Mobility Function (AMF) to trigger 5G Core (5GC) to switch the downlink (DL) data path towards the target gNB and to establish an NG-C interface instance towards the target gNB.

Step 10. 5GC switches the DL data path towards the target gNB. The User Plane Function (UPF) sends one or more "end marker" packets on the old path to the source gNB per PDU session/tunnel and then can release any U-plane/TNL (Transport Network Layer) resources towards the source gNB. The source gNB may similarly send one or more "end marker" packets to the target gNB.

At this point, the target gNB may transmit user data to and receive user data from the UPF(s) for the UE.

Step 11. The AMF confirms the PATH SWITCH REQUEST message with the PATH SWITCH REQUEST ACKNOWLEDGE message.

Step 12. Upon reception of the PATH SWITCH REQUEST ACKNOWLEDGE message from the AMF, the target gNB sends the UE CONTEXT RELEASE to inform the source gNB about the success of the handover. The source gNB can then release radio and C-plane related resources associated to the UE context. Any ongoing data forwarding may continue.

Both in LTE and NR, some principles exist for handovers (or in more general terms, mobility in RRC_CONNECTED). Mobility in RRC_CONNECTED is network-based as the network has the best information regarding the current situation such as load conditions, resources in different nodes, available frequencies, etc. The network can also take into account the situation of many UEs in the network, for a resource allocation perspective. The network prepares a target cell before the UE accesses that cell. The source cell provides the UE with the RRC configuration to be used in the target cell, including SRB1 configuration to send handover (HO) complete. The UE is provided by the target cell with a target C-RNTI i.e. target identifies UE from Message 3 (MSG.3) on the Medium Access Control (MAC) level for the HO complete message. Hence, there is no context fetching, unless a failure occurs. To speed up the handover, the network provides needed information on how to access the target, e.g. Random Access Channel (RACH) configuration, so the UE does not have to acquire System Information (SI) prior to the handover. The UE may be provided with contention-free random access (CFRA) resources, i.e. in that case the target cell identifies the UE from the preamble (MSG.1). The principle behind this is that the procedure can always be optimized with dedicated resources.

Consider now reporting configuration in NR. In NR, the UE can be configured with periodical reporting configurations and/or event triggered-reporting configurations (A1-A6 and B1-132).

Heretofore, a reporting configuration in NR is specified as below:

ReportConfigNR

The IE ReportConfigNR specifies criteria for triggering of an NR measurement reporting event. Measurement reporting events are based on cell measurement results, which can either be derived based on Synchronization Signal/Physical Broadcast Channel (SS/PBCH) block or Channel State Information Reference Signal (CSI-RS). These events are labelled AN with N equal to 1, 2 and so on.

- Event A1: Serving becomes better than absolute threshold;
- Event A2: Serving becomes worse than absolute threshold;
- Event A3: Neighbour becomes amount of offset better than PCell/PSCell;
- Event A4: Neighbour becomes better than absolute threshold;
- Event A5: PCell/PSCell becomes worse than absolute threshold1 AND Neighbour/SCell becomes better than another absolute threshold2.
- Event A6: Neighbour becomes amount of offset better than SCell.

ReportConfigNR information element

```
-- ASN1START
-- TAG-REPORT-CONFIGNR-START
ReportConfigNR ::=                SEQUENCE {
 reportType                      CHOICE {
  periodical                      PeriodicalReportConfig,
  eventTriggered                    EventTriggerConfig,
  ...,
  reportCGI                        ReportCGI
 }
}
ReportCGI ::=                  SEQUENCE {
 cellsForWhichToReportCGI         PhysCellId,
  ...,
}
EventTriggerConfig::=             SEQUENCE {
 eventId                        CHOICE {
  eventA1                         SEQUENCE {
   a1-Threshold                      MeasTriggerQuantity,
   reportOnLeave                       BOOLEAN,
   hysteresis                        Hysteresis,
   timeToTrigger                       TimeToTrigger,
  },
  eventA2                         SEQUENCE {
   a2-Threshold                      MeasTriggerQuantity,
   reportOnLeave                       BOOLEAN,
   hysteresis                        Hysteresis,
   timeToTrigger                       TimeToTrigger,
  },
  eventA3                         SEQUENCE {
   a3-Offset                        MeasTriggerQuantityOffset,
   reportOnLeave                       BOOLEAN,
   hysteresis                        Hysteresis,
```

-continued

ReportConfigNR information element

```
    timeToTrigger                   TimeToTrigger,
    useWhiteCellList                BOOLEAN
  },
  eventA4                         SEQUENCE {
    a4-Threshold                    MeasTriggerQuantity,
    reportOnLeave                   BOOLEAN,
    hysteresis                      Hysteresis,
    timeToTrigger                   TimeToTrigger,
    useWhiteCellList                BOOLEAN
  },
  eventA5                         SEQUENCE {
    a5-Threshold1                   MeasTriggerQuantity,
    a5-Threshold2                   MeasTriggerQuantity,
    reportOnLeave                   BOOLEAN,
    hysteresis                      Hysteresis,
    timeToTrigger                   TimeToTrigger,
    useWhiteCellList                BOOLEAN
  },
  eventA6                         SEQUENCE {
    a6-Offset                       MeasTriggerQuantityOffset,
    reportOnLeave                   BOOLEAN,
    hysteresis                      Hysteresis,
    timeToTrigger                   TimeToTrigger,
    useWhiteCellList                BOOLEAN
  },
  ...,
 },
 rsType                         NR-RS-Type,
 reportInterval                 ReportInterval,
 reportAmount                   ENUMERATED {r1, r2, r4, r8, r16, r32, r64, infinity},
 reportQuantityCell             MeasReportQuantity,
 maxReportCells                 INTEGER (1..maxCellReport),
 reportQuantityRSIndexes        MeasReportQuantity
OPTIONAL, -- Need R
 maxNrofRSIndexesToReport       INTEGER (1..maxNrofIndexesToReport)
OPTIONAL, -- Need R
 includeBeamMeasurements        BOOLEAN,
 reportAddNeighMeas             ENUMERATED {setup}
OPTIONAL, -- Need R
 ...,
}
PeriodicalReportConfig ::=      SEQUENCE {
 rsType                         NR-RS-Type,
 reportInterval                 ReportInterval,
 reportAmount                   ENUMERATED {r1, r2, r4, r8, r16, r32, r64, infinity},
 reportQuantityCell             MeasReportQuantity,
 maxReportCells                 INTEGER (1..maxCellReport),
 reportQuantityRSIndexes        MeasReportQuantity
OPTIONAL, -- Need R
 maxNrofRSIndexesToReport       INTEGER (1..maxNrofIndexesToReport)
OPTIONAL, -- Need R
 includeBeamMeasurements        BOOLEAN,
 useWhiteCellList               BOOLEAN,
 ...,
}
NR-RS-Type ::=                  ENUMERATED {ssb, csi-rs}
MeasTriggerQuantity ::=         CHOICE {
 rsrp                           RSRP-Range,
 rsrq                           RSRQ-Range,
 sinr                           SINR-Range
}
MeasTriggerQuantityOffset ::=   CHOICE {
 rsrp                           INTEGER (-30..30),
 rsrq                           INTEGER (-30..30),
 sinr                           INTEGER (-30..30)
}
MeasReportQuantity ::=          SEQUENCE {
 rsrp                           BOOLEAN,
 rsrq                           BOOLEAN,
 sinr                           BOOLEAN
}
-- TAG-REPORT-CONFIGNR-STOP
-- ASN1STOP
```

Some embodiments herein address certain challenge(s) that exist when a reporting configuration is specified as above. In NR, both periodic and event based measurement report triggering is supported. In order to collect these measurements, the network could configure periodical reporting. When the periodical reporting is configured, the UE sends the measurement report with a fixed periodicity. Heretofore, the measurements included in the measurement report are associated to the serving frequency only. The network could alternatively configure event triggered reporting. Event triggered reporting is used mainly for handover, load balancing related actions via handover or carrier aggregation and also for triggering inter-frequency measurements etc. When the event triggering criterion is satisfied, the UE sends the measurement report (upon fulfilling the event entering condition for Time-To-Trigger duration). Heretofore, the UE includes the measurements associated to the serving frequencies and also the measurements of the cells that have satisfied the event triggering criterion associated to the event that triggered the measurement report.

Based on the above, there is heretofore no way for the network to collect measurements on a second frequency based on the event conditions associated with the measurements on a first frequency.

Certain aspects of the present disclosure and their embodiments may provide solutions to these or other challenges. Some embodiments propose a measurement reporting framework, e.g., for RRC connected mode UEs. The measurement reporting framework may include the following event-based measurement reporting configuration that includes the following separation between the triggering configuration and the reporting configuration.

1) One or more report triggering configurations based on the measurements associated to a first set of frequencies.

2) a measurement reporting configuration based on the measurements associated to a second set of frequencies.

Some embodiments thereby separate the frequencies associated to the measurements responsible for triggering the measurement report and the frequencies associated to the measurements included in the measurement report.

Figure 10:
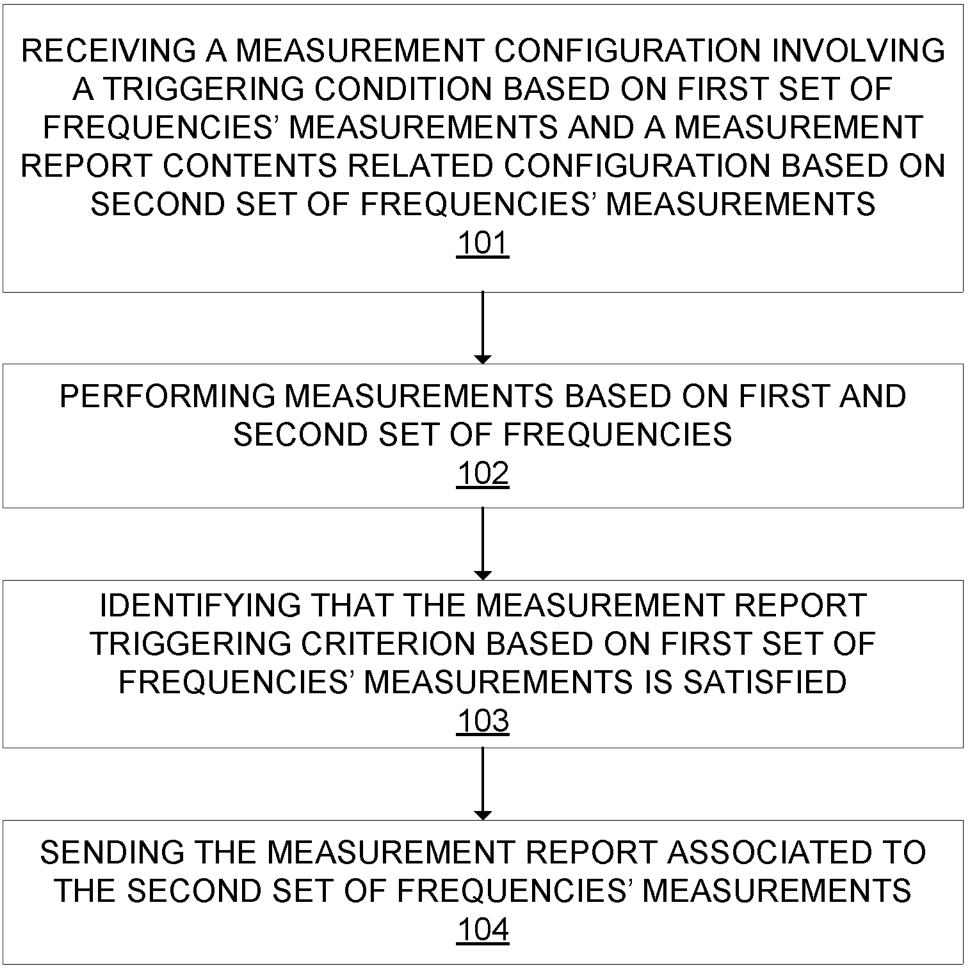
FIG. 10 is a logic flow diagram of a method performed by a user equipment in accordance with particular embodiments.

The UE actions based on some embodiments is summarized in FIG. 10.

Step 100: The UE optionally signals its capabilities in measuring on a set of frequencies.

Step 101: Measurement reporting configuration reception. Based on the received UE capabilities, the network node selects a measurement configuration for the UE, which is then transmitted to the UE. The measurement configuration received by the UE includes an event-based report configuration that comprises: (i) event triggering criterion configuration based on a first set of frequencies; and (ii) measurement report contents' configuration based on a second set of frequencies.

The first set of frequencies are those frequencies whose measurements are to be used for measurement report triggering criterion evaluation. The first set of frequencies represents one example of the report triggering measurement object(s) 22 in FIG. 1. Regardless, there can be one (single trigger quantity (e.g., RSRP) or multiple trigger quantities (e.g., RSRP and RSRQ)). Each of the reporting criterion may be represented by a threshold on a measurement quantity (e.g. RSRP, RSRQ, signal-to-interference-plus-noise-ratio (SINR) reference signal strength indicator, RSSI), or by a range of values of the measurement quantity (RSRP1-RSRP2, RSRQ1-RSRQ2, SINR1-SINR2 etc.).

The second set of frequencies are those frequencies whose measurements are to be included in the measurement report when the event triggering criterion as specified above is fulfilled. The second set of frequencies represents one example of the report content measurement object(s) 24 in FIG. 1. Regardless, in some embodiments, the second set of frequencies has at least one frequency that is not part of the first set of frequencies.

One example implementation of such a configuration is provided in the following ASN.1 specification, as an elaboration of the example shown in FIG. 2. In the below text, the MeasIdToAddModList information element exemplifies the MeasIdToAddMod 20 in FIG. 2, measId exemplifies measId 32 in FIG. 2, measObjectTriggerIdList exemplifies measObjectTriggerIdList 22 in FIG. 2, measObjectReportIdList exemplifies measObjectContentIdList 24 in FIG. 2, reportConfigTriggerIdList exemplifies reportConfigTriggerIdList in FIG. 2, and reportConfigReportIdList exemplifies reportConfigContentIdList in FIG. 2. The UE behavior associated to such a configuration is captured in the following text.

MeasIdToAddModList information element

```
-- ASN1START
-- TAG-MEASIDTOADDMODLIST-START
MeasIdToAddModList ::=                SEQUENCE (SIZE
(1..maxNrofMeasId)) OF MeasIdToAddMod
MeasIdToAddMod ::=                    SEQUENCE {
  measId                              MeasId,
  measObjectTriggerIdList             MeasObjectIdList,
  measObjectReportIdList              MeasObjectIdList,
  reportConfigTriggerIdList           ReportConfigIdList,
  reportConfigReportIdList            ReportConfigIdList
}
MeasObjectIdList ::=                  SEQUENCE (SIZE
(1..maxNrofObjectId)) OF MeasObjectId
ReportConfigIdList ::=                SEQUENCE (SIZE (1..
maxReportConfigId)) OF ReportConfigId
-- TAG-MEASIDTOADDMODLIST-STOP
-- ASN1STOP
```

The measObjectTriggerIdList provides the list of frequencies (referred as first set of frequencies) whose measurements are used to evaluate the report triggering criterion listed in the reportConfigTriggerIdList. The first entry of measObjectTriggerIdList is used in conjunction with the first entry of reportConfigTriggerIdList. For example, consider that the measObjectTriggerIdList provides configuration related to two frequencies, F1 and F2. The reportConfigTriggerIdList contains two sets of triggering quantities, e.g., the first one being RSRP (RSRP1) and the second being RSRQ (RSRQ2). In such a configuration, RSRP is the triggering quantity for F1 related measurements and RSRQ is the triggering quantity for F2 related measurements. Further, there can be one more report triggering configuration which indicates the logical operations to be used between the measurements of F1 and F2 e.g., AND operation. In the above example, if the logical operation is the AND operation, then the UE shall identify that the report triggering condition is met when the RSRP measurements of F1 is above RSRP1 AND the RSRQ measurements on F2 is above RSRQ2.

The measObjectReportIdList provides the list of frequencies (referred as second set of frequencies) whose measurements are included in the measurement report. The list of measurement quantities to be report per measObjectReportIdList is listed in the reportConfigReportIdList. The first entry of measObjectReportIdList is used in conjunction with the first entry of reportConfigReportIdList. For example, consider that the measObjectReportIdList provides configuration related to two frequencies, F3 and F4.

The reportConfigReportIdList contains two set of reporting quantities, one set each for F3 and F4. For example, reportConfigReportIdList might contain RSRP and RSRQ as reporting quantities for F3 related measurements and only RSRQ as reporting quantity for F4 related measurements.

In another embodiment, to each of the frequencies in the first set (e.g. listed in measObjectTriggerIdList) it is associated more than one report triggering criterion (e.g. in ReportConfigIdList) wherein each report triggering criterion represent a different range of a given measurement quantity. For example, the frequency F1 may be associated to multiple ranges of RSRP values, so that for each RSRP range the UE reports a separate measurement report for the quantities (e.g. listed reportConfigReportIdList) associated to the second set of frequencies (e.g. listed in measObjectReportIdList), To realize this functionality, each ReportConfigId may be associated to one range of a measurement quantity, i.e. RSRP1 and RSRP2 in the ASN.1 example below (the example shows only for event A1 but this can be extended for other events too), so that when the RSRP measured in the first set of frequencies is between RSRP1 and RSRP2, the UE reports a measurement of a measurement quantity in the second set of frequencies. Different ranges of the same measurement quantity associated to different reportConfID for the same frequency may be represented by different measurement IDs in the MeasIdToAddMod configuration.

For each such range, the measurement can be periodic or event-triggered meaning that the UE triggers a measurement report whenever the measurement of the measured quantity in the first set of frequencies jumps from one range to another.

ReportConfigNR information element

```
-- ASN1START
-- TAG-REPORTCONFIGNR-START
ReportConfigNR ::=                    SEQUENCE {
  reportType                          CHOICE {
    periodical                          PeriodicalReportConfig,
    eventTriggered                      EventTriggerConfig,
    ...,
    reportCGI                           ReportCGI,
    reportSFTD                          ReportSFTD-NR,
    [[
    cho-TriggerConfig-r16               CHO-TriggerConfig-r16,
    cli-Periodical-r16                  CLI-PeriodicalReportConfig-r16,
    cli-EventTriggered-r16              CLI-EventTriggerConfig-r16
    ]]
  }
}
ReportCGI ::=                         SEQUENCE {
  cellForWhichToReportCGI               PhysCellId,
    ...
}
ReportSFTD-NR ::=                     SEQUENCE {
  reportSFTD-Meas                       BOOLEAN,
  reportRSRP                            BOOLEAN,
  ...,
  [[
  reportSFTD-NeighMeas                  ENUMERATED {true}          OPTIONAL, -- Need R
  drx-SFTD-NeighMeas                    ENUMERATED {true}          OPTIONAL, -- Need R
  cellsForWhichToReportSFTD             SEQUENCE (SIZE (1..maxCellSFTD)) OF PhysCellId
                                                                   OPTIONAL  -- Need R

  ]]
}
CHO-TriggerConfig-r16 ::=             SEQUENCE {
  cho-eventId                           CHOICE {
    cho-eventA3                           SEQUENCE {
      a3-Offset                           MeasTriggerQuantityOffset,
      hysteresis                          Hysteresis,
      timeToTrigger                       TimeToTrigger
    },
    cho-eventA5                           SEQUENCE {
      a5-Threshold1                       MeasTriggerQuantity,
      a5-Threshold2                       MeasTriggerQuantity,
      hysteresis                          Hysteresis,
      timeToTrigger                       TimeToTrigger
    },
    ...
  },
  rsType-r16                            NR-RS-Type,
  ...
}
EventTriggerConfig::=                 SEQUENCE {
  eventId                               CHOICE {
    eventA1                               SEQUENCE {
      a1-Threshold                        MeasTriggerQuantity,
      reportOnLeave                       BOOLEAN,
      hysteresis                          Hysteresis,
      timeToTrigger                       TimeToTrigger
    },
    eventA2                               SEQUENCE {
```

-continued

```
ReportConfigNR information element

      a2-Threshold                          MeasTriggerQuantity,
      reportOnLeave                          BOOLEAN,
      hysteresis                            Hysteresis,
      timeToTrigger                          TimeToTrigger
    },
    eventA3                               SEQUENCE {
      a3-Offset                             MeasTriggerQuantityOffset,
      reportOnLeave                          BOOLEAN,
      hysteresis                            Hysteresis,
      timeToTrigger                          TimeToTrigger,
      useWhiteCellList                       BOOLEAN
    },
    eventA4                               SEQUENCE {
      a4-Threshold                          MeasTriggerQuantity,
      reportOnLeave                          BOOLEAN,
      hysteresis                            Hysteresis,
      timeToTrigger                          TimeToTrigger,
      useWhiteCellList                       BOOLEAN
    },
    eventA5                               SEQUENCE {
      a5-Threshold1                          MeasTriggerQuantity,
      a5-Threshold2                          MeasTriggerQuantity,
      reportOnLeave                          BOOLEAN,
      hysteresis                            Hysteresis,
      timeToTrigger                          TimeToTrigger,
      useWhiteCellList                       BOOLEAN
    },
    eventA6                               SEQUENCE {
      a6-Offset                             MeasTriggerQuantityOffset,
      reportOnLeave                          BOOLEAN,
      hysteresis                            Hysteresis,
      timeToTrigger                          TimeToTrigger,
      useWhiteCellList                       BOOLEAN
    },
    ...
  },
  rsType                                NR-RS-Type,
  reportInterval                          ReportInterval,
  reportAmount                            ENUMERATED {r1, r2, r4, r8, r16, r32, r64, infinity},
  reportQuantityCell                       MeasReportQuantity,
  maxReportCells                          INTEGER (1..maxCellReport),
  reportQuantityRS-Indexes                   MeasReportQuantity
OPTIONAL, -- Need R
  maxNrofRS-IndexesToReport                  INTEGER (1..maxNrofIndexesToReport)
OPTIONAL, -- Need R
  includeBeamMeasurements                    BOOLEAN,
  reportAddNeighMeas                        ENUMERATED {setup}
OPTIONAL, -- Need R
  ...,
  [[
    useT312-r16                           BOOLEAN                        OPTIONAL,  -- Need M
   includeCommonLocationInfo-r16             ENUMERATED {true}               OPTIONAL,  -- Need R
   includeBT-Meas-r16                       BT-NameListConfig-r16            OPTIONAL,  -- Need R
   includeWLAN-Meas-r16                     WLAN-NameListConfig-r16          OPTIONAL,  -- Need R
   includeSensor-Meas-r16                   Sensor-NameListConfig-r16         OPTIONAL, -- Need R
   measRSSI-ReportConfig-r16                 MeasRSSI-ReportConfig-r16         OPTIONAL  -- Need R
  ]],
   [[
      EventTriggerConfig-r17::=                     SEQUENCE {
  eventId-r17                             CHOICE {
    eventA1-r17                             SEQUENCE {
      a1-Threshold                          MeasTriggerQuantity-r17,
      reportOnLeave                          BOOLEAN,
      hysteresis                            Hysteresis,
      timeToTrigger                          TimeToTrigger
    },
   ]]
}
PeriodicalReportConfig ::=                   SEQUENCE {
  rsType                                NR-RS-Type,
  reportInterval                          ReportInterval,
  reportAmount                            ENUMERATED {r1, r2, r4, r8, r16, r32, r64, infinity},
  reportQuantityCell                       MeasReportQuantity,
  maxReportCells                          INTEGER (1..maxCellReport),
  reportQuantityRS-Indexes                   MeasReportQuantity
OPTIONAL, -- Need R
  maxNrofRS-IndexesToReport                  INTEGER (1..maxNrofIndexesToReport)
```

-continued

```
ReportConfigNR information element

OPTIONAL, -- Need R
 includeBeamMeasurements                BOOLEAN,
 useWhiteCellList                       BOOLEAN,
 ... ,
  [[
   includeCommonLocationInfo-r16        ENUMERATED {true}           OPTIONAL,   -- Need R
   includeBT-Meas-r16                   BT-NameListConfig-r16       OPTIONAL,   -- Need R
   includeWLAN-Meas-r16                 WLAN-NameListConfig-r16     OPTIONAL,   -- Need R
   includeSensor-Meas-r16               Sensor-NameListConfiq-r16   OPTIONAL,   -- Need R
   ul-DelayRatioConfig-r16              SetupRelease { UL-DelayRatioConfig-r16 }
                                                                    OPTIONAL,   -- Need R
   ul-DelayValueConfig-r16              SetupRelease { UL-DelayValueConfig-r16 }
                                                                    OPTIONAL    -- Need R
  ]]
}
NR-RS-Type ::=                          ENUMERATED {ssb, csi-rs}
MeasTriggerQuantity-r17 ::=             SEQUENCE {
  rangeQuantity1-r17                    CHOICE {
  rsrp1                                   RSRP-Range,
  rsrq1                                   RSRQ-Range,
  sinr1                                   SINR-Range
  }
  rangeQuantity2-r17                    CHOICE {
  rsrp2                                   RSRP-Range,
  rsrq2                                   RSRQ-Range,
  sinr2                                   SINR-Range
  }
}
MeasTriggerQuantityOffset-r17 ::=       SEQUENCE {
  rangeOffset1-r17                      CHOICE {
  rsrp1                                   INTEGER (-30..30),
  rsrq1                                   INTEGER (-30..30),
  sinr1                                   INTEGER (-30..30)
  }
  rangeOffset2-r17                      CHOICE {
  rsrp2                                   INTEGER (-30..30),
  rsrq2                                   INTEGER (-30..30),
  sinr2                                   INTEGER (-30..30),
  }
}
MeasTriggerQuantity ::=                 CHOICE {
 rsrp                                   RSRP-Range,
 rsrq                                   RSRQ-Range,
 sinr                                   SINR-Range
}
MeasTriggerQuantityOffset ::=           CHOICE {
 rsrp                                   INTEGER (-30..30),
 rsrq                                   INTEGER (-30..30),
 sinr                                   INTEGER (-30..30)
}
MeasReportQuantity ::=                  SEQUENCE {
 rsrp                                   BOOLEAN,
 rsrq                                   BOOLEAN,
 sinr                                   BOOLEAN
}
CLI-EventTriggerConfig-r16 ::=          SEQUENCE {
 eventId-r16                            CHOICE {
   eventI1-r16                            SEQUENCE {
    i1-Threshold-r16                        MeasTriggerQuantityCLI-r16,
    reportOnLeave-r16                       BOOLEAN,
    hysteresis-r16                          Hysteresis,
    timeToTrigger-r16                       TimeToTrigger
   },
    ...
 },
 reportInterval-r16                     ReportInterval,
 reportAmount-r16                       ENUMERATED {r1, r2, r4, r8, r16, r32, r64, infinity},
 maxReportCLI-r16                       INTEGER (1..maxCLI-Report-r16),
 ...
}
CLI-PeriodicalReportConfig-r16 ::=      SEQUENCE {
 reportInterval-r16                     ReportInterval,
 reportAmount-r16                       ENUMERATED {r1, r2, r4, r8, r16, r32, r64, infinity},
 reportQuantityCLI-r16                  MeasReportQuantityCLI-r16,
 maxReportCLI-r16                       INTEGER (1..maxCLI-Report-r16),
 ...
}
```

-continued

```
ReportConfigNR information element

MeasTriggerQuantityCLI-r16 ::=          CHOICE {
 srs-RSRP-r16                          SRS-RSRP-Range-r16,
 cli-RSSI-r16                          CLI-RSSI-Range-r16
}
MeasReportQuantityCLI-r16 ::=           ENUMERATED {srs-rsrp, cli-rssi}
MeasRSSI-ReportConfig-r16 ::=            SEQUENCE {
 channelOccupancyThreshold-r16           ENUMERATED{ffs}        OPTIONAL, -- Need R
 ...
}
-- TAG-REPORTCONFIGNR-STOP
-- ASN1STOP
```

In some embodiments, measObjectTriggerIdList are considered to be part of the measObjectReportIdList by default i.e., the UE shall always include the measurements (the measurement quantities will be decided based on reportConfigTriggerIdList) associated to the frequencies listed in measObjectTriggerIdList even when they are not part of measObjectReportIdList.

Consider now some embodiments for selecting measurement object triggering conditions.

In embodiments such as those in FIG. 4 where the network node employs a model for predicting radio coverage, the trigger condition could be set at the network using the current trained model, in order to configure more measurements in areas where the model is underperforming. The trained model could predict the coverage probability (a signal quality above a certain threshold) of a frequency in the second set, given the measurements on frequencies in the first set. Assume for example that the measurements (1-5) in FIG. 4 are measurements on the first set of frequencies, and p is the probability of coverage on a second set frequency. Further assume that in the figure p5-p8 is very uncertain (values close to 0.5 meaning a 50% chance of coverage), then one could configure the UE to report a measurement when a UE is in that part of the tree (i.e. when measurement 1>t1). Or another example when p8 is inaccurate, report when the following criteria is met: meas1>t1 and meas. 5>t5 and meas.4>t7.

In another embodiment, the network can configure a report for measurement that has not been collected during the training phase. For example, the network can trigger a report when a new cell or beam ID is detected. Or too few measurements with said ID has been collected.

Step 102 in FIG. 10: Performing measurements based on first and second set of frequencies. The UE shall perform the measurements for all the frequencies configured either for the evaluation of measurement report triggering purpose or for the contents of measurement report purpose.

Step 103: Identifying whether the measurement report triggering criterion based on the first set of frequencies' measurements is satisfied, e.g., as an example of report triggering evaluation 26 in FIG. 1.

The UE recognizes that the measurement report triggering criterion based on the combination of measObjectTriggerIdList+reportConfigTriggerIdList has been satisfied. In some further embodiments, the network can indicate the logical operation (AND-OR) between the conditions across frequencies. In the example of F1 and F2 listed in step 101, when the logical operation is AND, then the measurement report is triggered when RSRP of the F1-cell meets the threshold condition configured in first entry of reportConfigTriggerIdList AND the RSRQ of the F2-cell meets the condition configured in second entry of reportConfigTriggerIdList.

Step 104: Sending the measurement report associated to the second set of frequencies' measurements. Such measurement report may exemplified measurement report 16 in FIG. 1.

The UE sends the measurement report and includes the measurements associated to frequencies in measObjectReportIdList.

In some embodiments, measObjectTriggerIdList are considered to be part of the measObjectReportIdList by default i.e., the UE shall always include the measurements (the measurement quantities will be decided based on reportConfigTriggerIdList) associated to the frequencies listed in measObjectTriggerIdList even when they are not part of measObjectReportIdList.

Some embodiments therefore allow for the network to collect a first set of frequencies' measurements based on a second set of frequencies' measurements' based report triggering criterion. The network can in one embodiment perform actions for the UE that performed and reported the first/second set frequency measurements. One action could be to perform a handover to one of the frequencies in the second frequency set.

Still other embodiments herein enable a combination of measurement report logging and sending. The ue flow chart associated to this embodiment is provided in FIG. 11.

Figure 11:
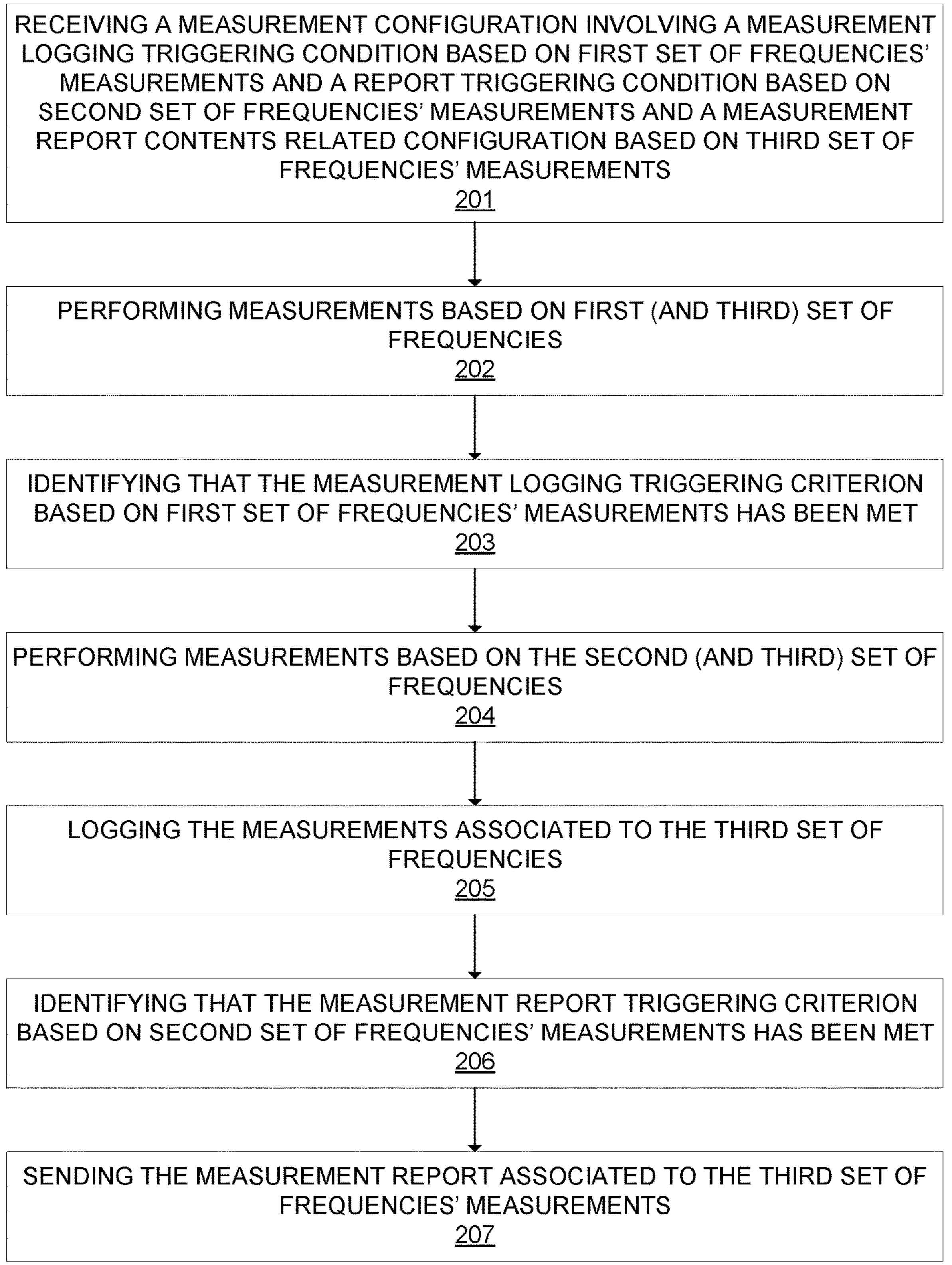
FIG. 11 is a logic flow diagram of a method performed by a user equipment in accordance with other embodiments.

As shown in FIG. 11, the ue receives a measurement configuration involving a measurement logging triggering condition based on a first set of frequencies' measurements, a report triggering condition based on a second set of frequencies' measurements, and a measurement report contents related configuration based on a third set of frequencies' measurements (step 201).

The ue as shown performs measurements based on the first (and third) set of frequencies (step 202).

The ue identifies that the measurement logging triggering criterion based on the first set of frequencies' measurements has been met (step 203). Based on this being met, the ue performs measurements based on the second (and third) set of frequencies (step 204). The ue logs the measurements associated to the third set of frequencies (step 205).

The ue identifies that the measurement report triggering criterion based on second set of frequencies' measurements has been met (step 206). Based on this, the ue sends the measurement report associated to the third set of frequencies' measurements (step 207).

In this embodiment, therefore, the logging triggering frequencies, logged report triggering frequencies and logged report related frequencies can be different from one another.

In some further embodiments, the logging interval associated to each of the logged frequencies could be different.

In these embodiments, then, the one or more report triggering measurement objects 22 as explained in FIG. 1 may comprise one or more report logging triggering measurement objects and one or more report sending triggering measurement objects. The one or more report logging triggering measurement objects are one or more objects of measurements whose results are to be evaluated by the wireless device for determining whether to log the measurement report. And the one or more report sending triggering measurement objects are one or more objects of measurements whose results are to be evaluated by the wireless device for determining whether to send the measurement report. In some embodiments, the wireless device 12 evaluates whether or not report logging criteria is met, based on results of the measurements performed on the one or more report logging triggering measurement objects. Based on the report logging criteria being met, the wireless device 12 logs the measurement report 12. And, based on the report logging criteria being met, the wireless device 12 also performs measurements on the one or more report sending triggering measurement objects. That is, performance of measurements on the one or more report sending triggering measurement objects may be conditioned on the report logging criteria being met. The wireless device 12 may then evaluate whether or not report sending criteria is met, based on results of the measurements performed on the one or more report sending triggering measurement objects. The wireless device 12 may then send or not send the measurement report depending on whether or not the report sending criteria is met.

Some embodiments herein are mentioned in terms of NR radio access technology (RAT) implementation. However, embodiments herein are also applicable for other RATs.

Figure 12:
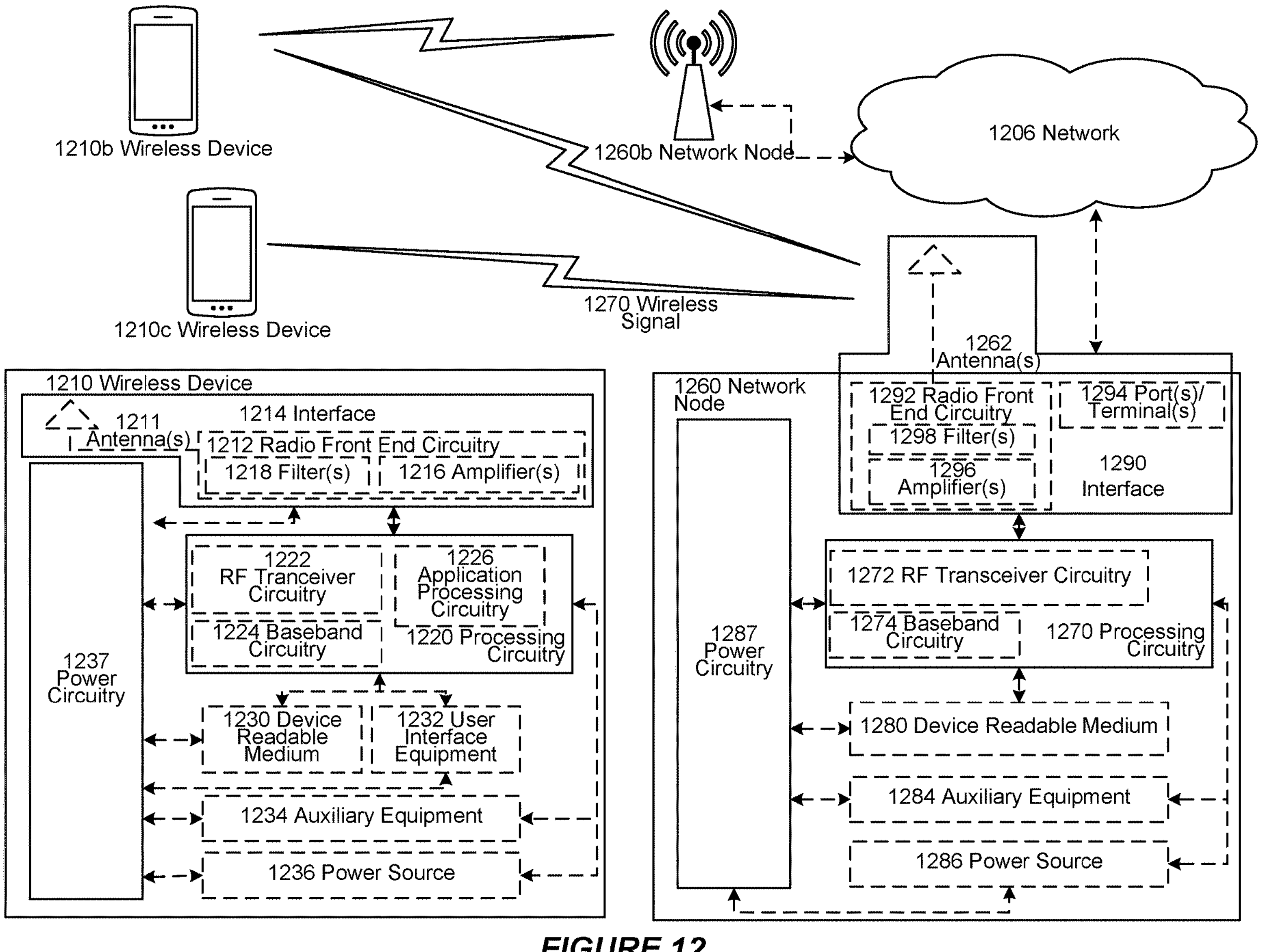
FIG. 12 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260*b*, and WDs 1210, 1210*b*, and 1210*c*. In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292.

The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
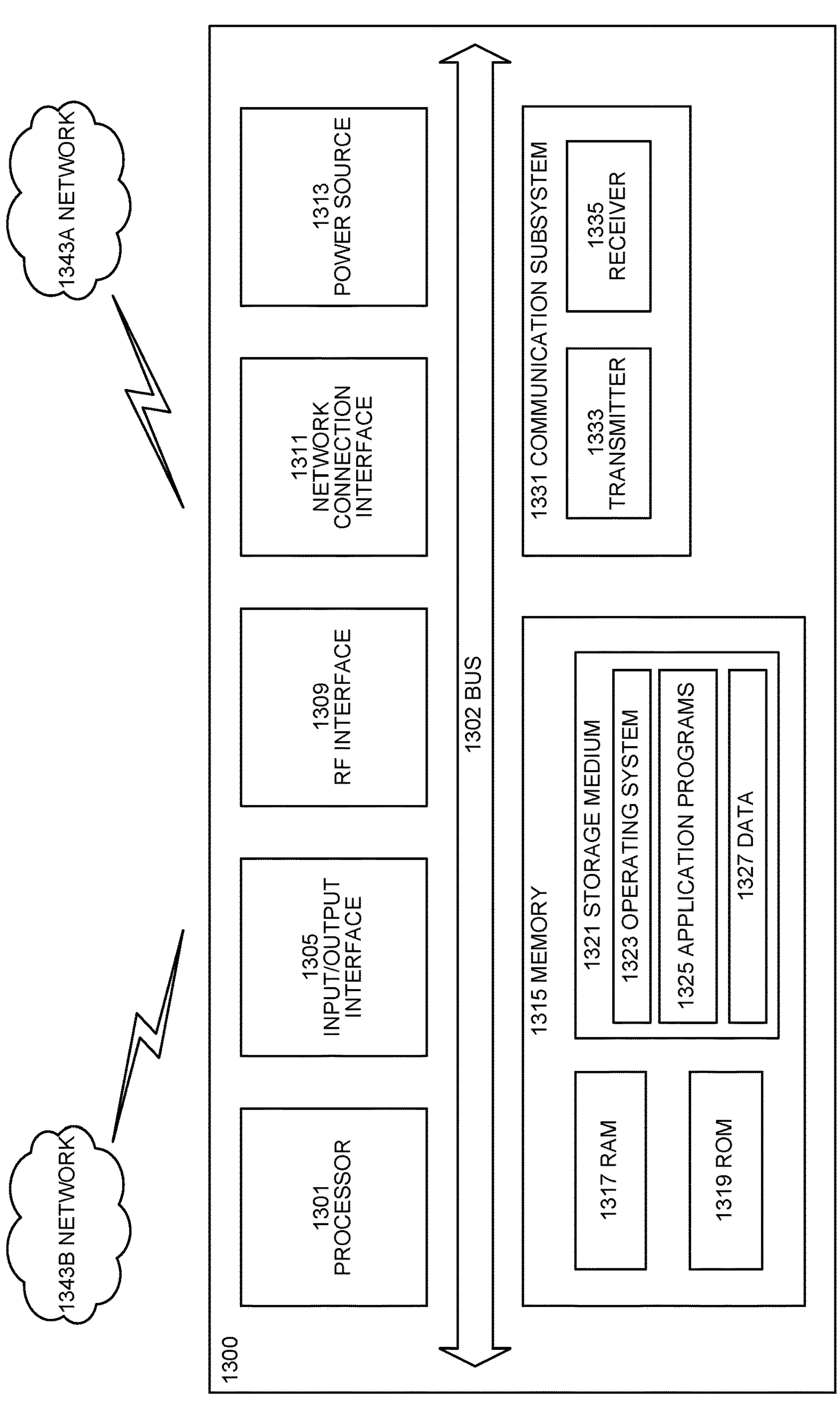
FIG. 13 is a block diagram of a user equipment according to some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the 3$^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343*a*. Network 1343*a* may encompass wired and/or wireless networks such as a local-area network (LAN), a wide-area network (WAN), a computer network, a wireless network, a telecommunications network, another like network or any combination thereof. For example, network 1343*a* may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343*b* using communication subsystem 1331. Network 1343*a* and network 1343*b* may be the same network or networks or different network or networks. Communication subsystem 1331 may be configured to include one or more transceivers used to communicate with network 1343*b*. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343*b* may encompass wired and/or wireless networks such as a local-area network (LAN), a wide-area network (WAN), a computer network, a wireless network, a telecommunications network, another like network or any combination thereof. For example, network 1343*b* may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
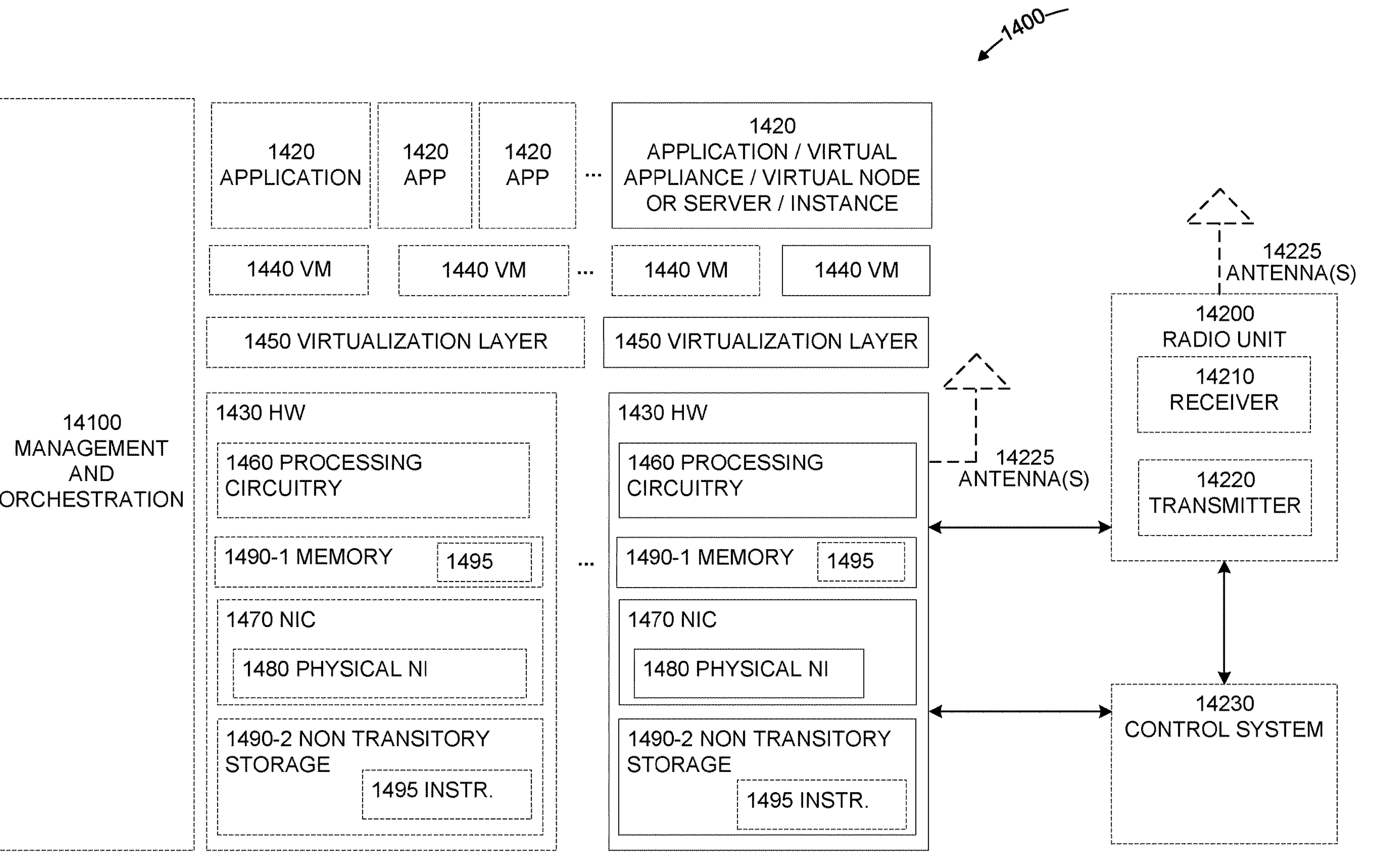
FIG. 14 is a block diagram of a virtualization environment according to some embodiments.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
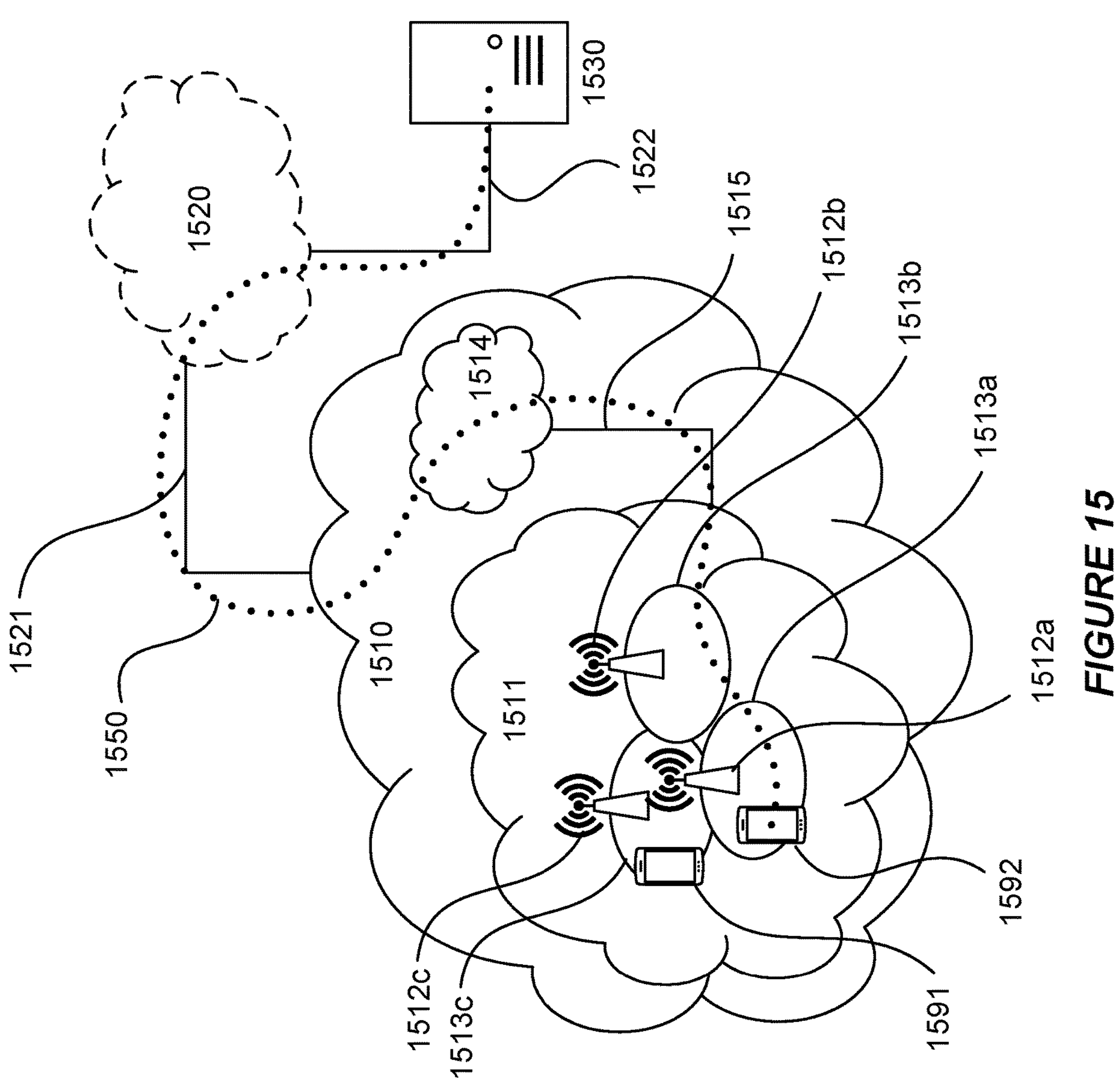
FIG. 15 is a block diagram of a communication network with a host computer according to some embodiments.

FIG. 15 illustrates a telecommunication network connected via an intermediate network to a host computer in accordance with some embodiments. In particular, with reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations **1512*a*, 1512*b*, 1512*c*, such as NBs, eNBs, gNBs or other types of wireless access points, each defining a corresponding coverage area 1513*a*, 1513*b*, 1513*c*. Each base station 1512*a*, 1512*b*, 1512*c* is connectable to core network 1514 over a wired or wireless connection 1515. A first UE 1591 located in coverage area 1513*c* is configured to wirelessly connect to, or be paged by, the corresponding base station 1512*c*. A second UE 1592 in coverage area 1513*a* is wirelessly connectable to the corresponding base station 1512*a*. While a plurality of UEs 1591, 1592 are illustrated in this example, the disclosed embodiments are equally applicable to a situation where a sole UE is in the coverage area or where a sole UE is connecting to the corresponding base station 1512**.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
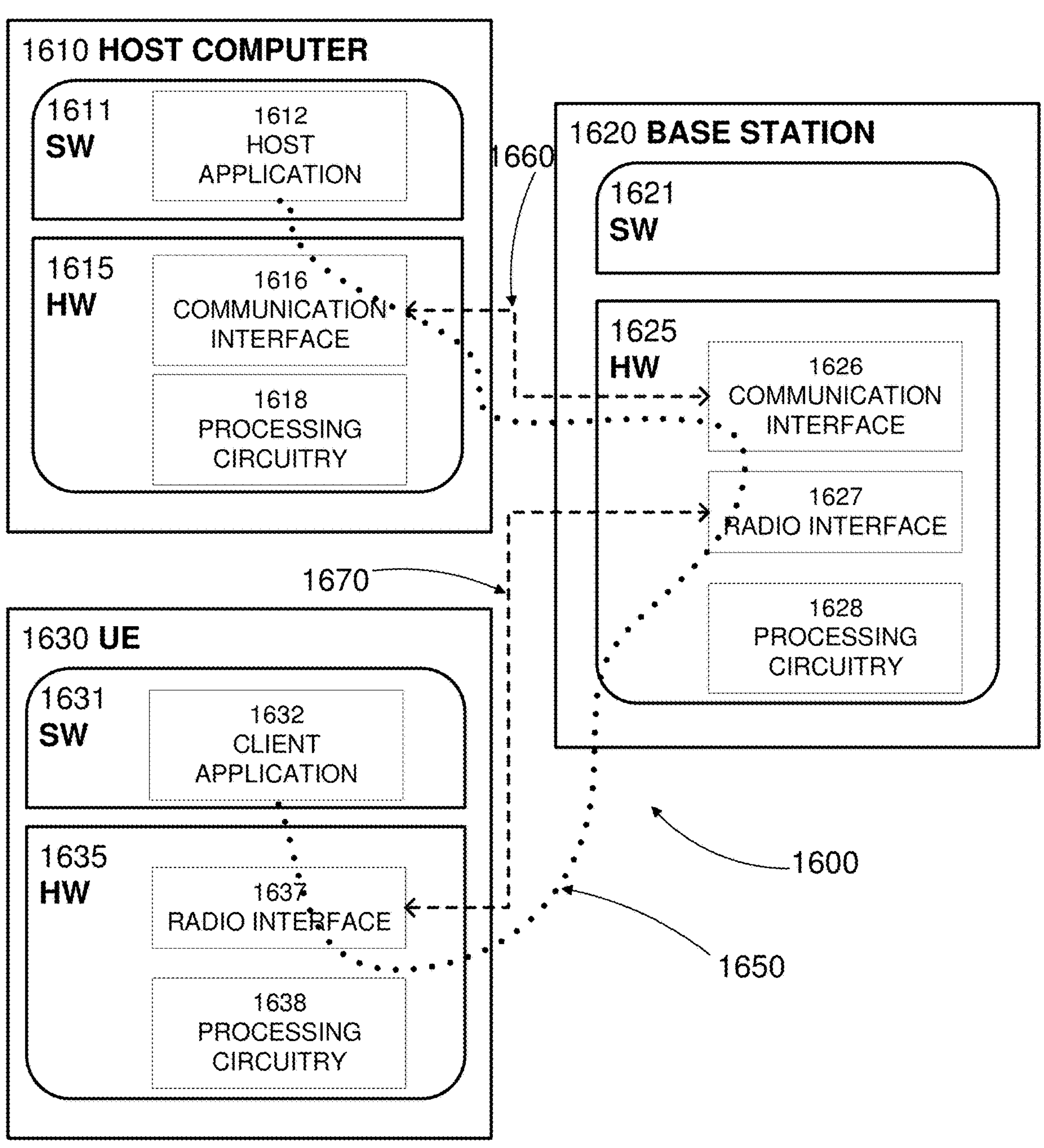
FIG. 16 is a block diagram of a host computer according to some embodiments.

Example implementations, in accordance with an embodiment, of the UE, base station and host computer discussed in the preceding paragraphs will now be described with reference to FIG. 16. FIG. 16 illustrates host computer communicating via a base station with a user equipment over a partially wireless connection in accordance with some embodiments In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512*a*, 1512*b*, 1512*c* and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
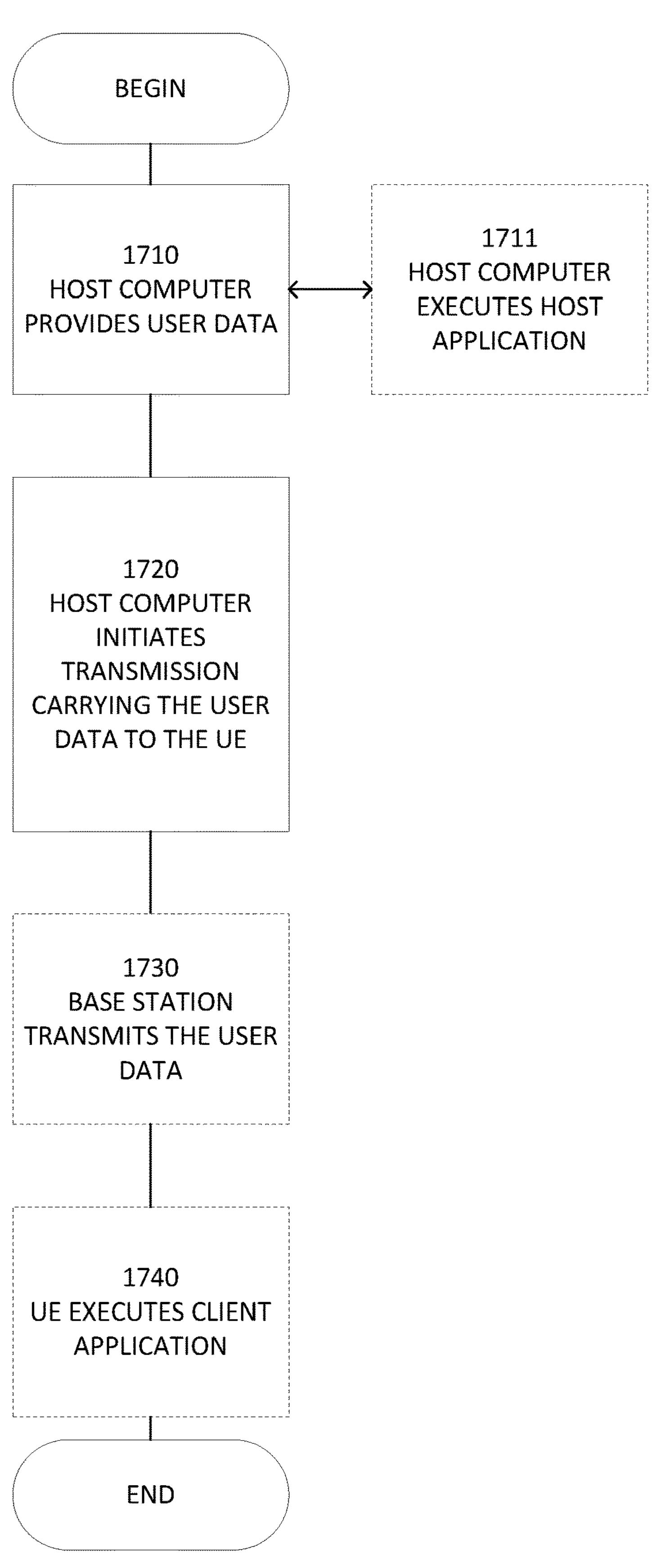
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
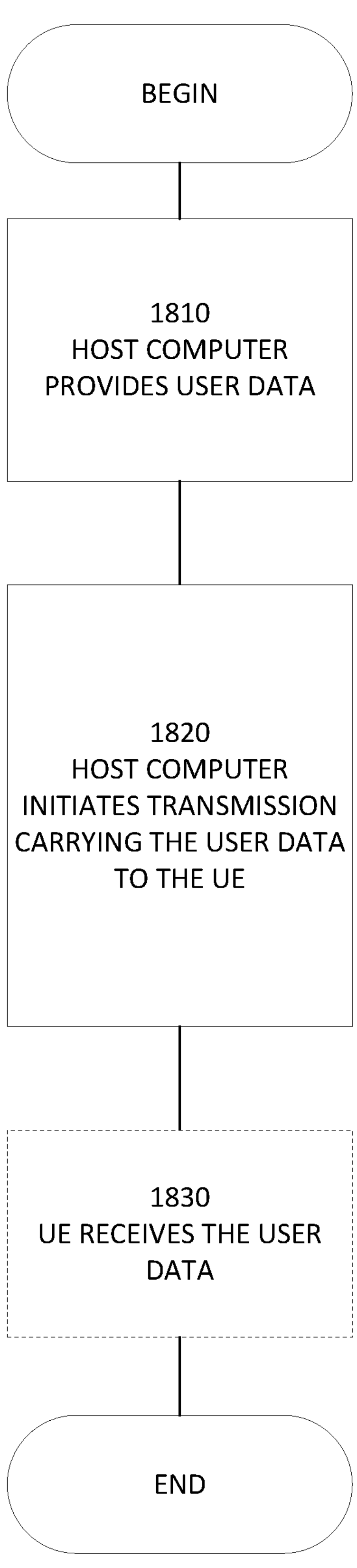
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
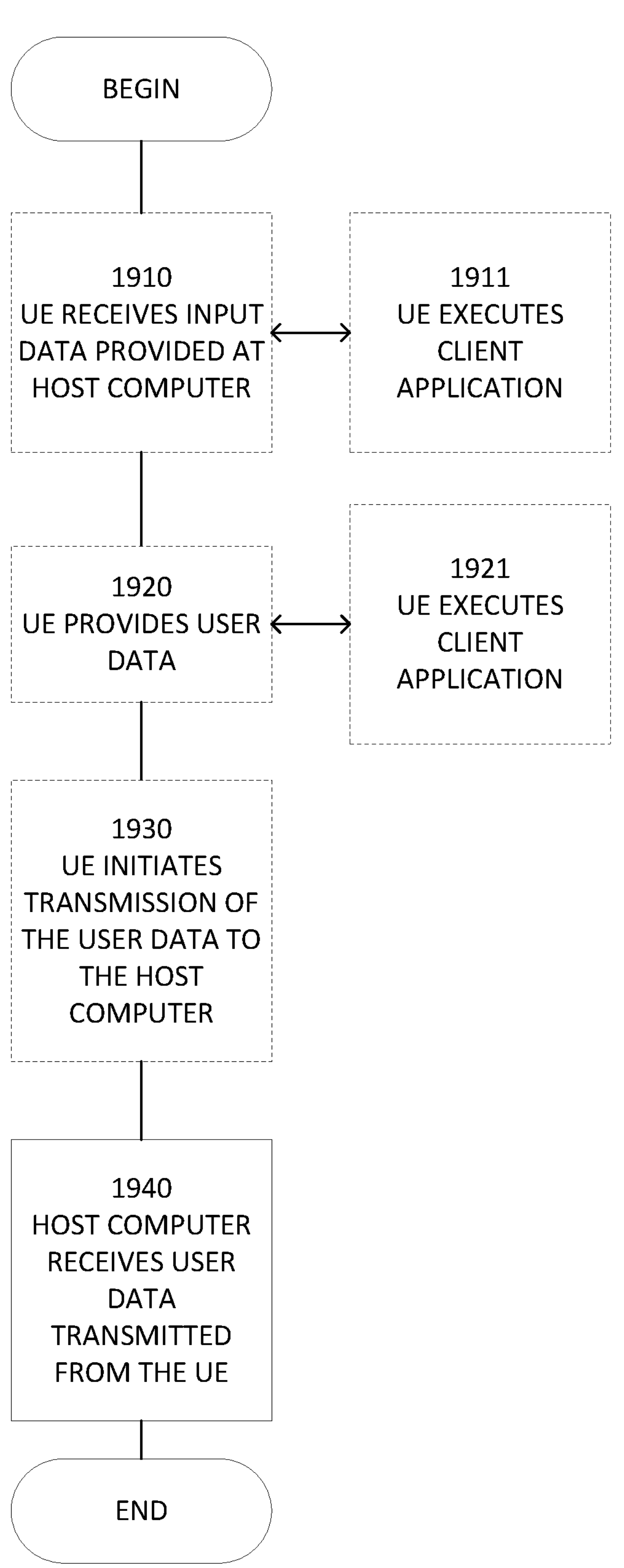
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
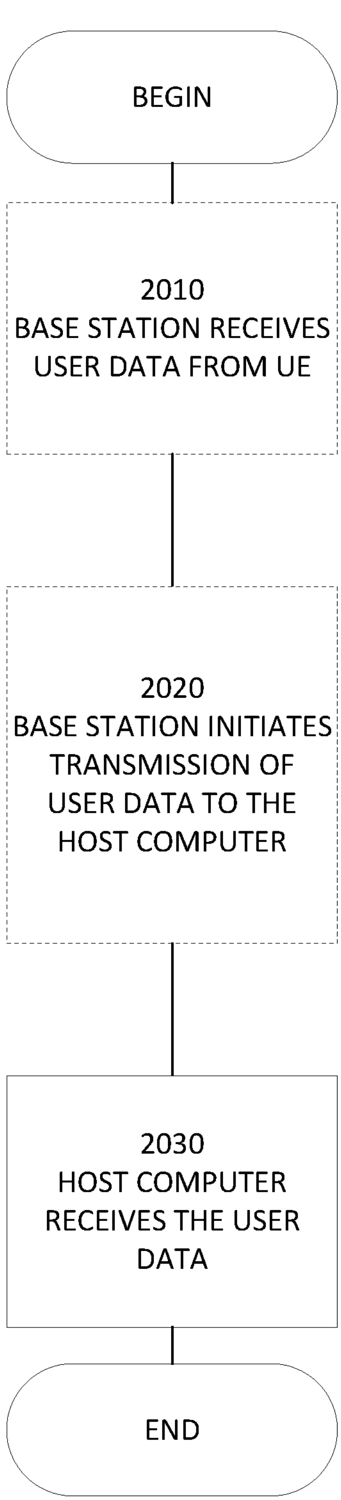
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Example embodiments of the techniques and apparatus described herein include, but are not limited to, the following enumerated examples:

Group A Embodiments

A1. A method performed by a wireless device configured for use in a wireless communication network, the method comprising:

receiving, from a network node in the wireless communication network, signaling that indicates one or more report triggering measurement objects and one or more report content measurement objects, wherein the one or more report triggering measurement objects are one or more objects of measurements whose results are to be evaluated by the wireless device for determining whether to log or send a measurement report, wherein the one or more report content measurement objects are one or more objects of measurements whose results are to be reported by the measurement report, and wherein the signaling is configurable to indicate at least one report content measurement object that is different from each of the one or more report triggering measurement objects indicated by the signaling.

A2. The method of embodiment A1, further comprising:

performing measurements on the one or more report triggering measurement objects;

based on results of the measurements performed on the one or more report triggering measurement objects, evaluating whether or not to log or send the measurement report; and logging or sending the measurement report, or refraining from logging or sending the measurement report, depending on said evaluating.

A3. The method of any of embodiments A1-A2, further comprising:

performing measurements on the one or more report content measurement objects; and logging or sending the measurement report, wherein the measurement report reports results of the measurements performed on the one or more report content measurement objects.

A4. The method of any of embodiments A1-A3, wherein at least one report content measurement object indicated by the signaling is different from each of the one or more report triggering measurement objects indicated by the signaling.

A5. The method of any of embodiments A1-A4, wherein each of the one or more report content measurement objects indicated by the signaling is different from each of the one or more report triggering measurement objects indicated by the signaling.

A6. The method of any of embodiments A1-A5, wherein the signaling indicates the one or more report triggering measurement objects separately from indicating the one or more report content measurement objects.

A7. The method of any of embodiments A1-A6, wherein the signaling includes a report triggering measurement object information element that indicates the one or more report triggering measurement objects and includes a report content measurement object information element that indicates the one or more report content measurement objects.

A8. The method of any of embodiments A1-A7, wherein the signaling indicates:

one or more report triggering criterions that the wireless device is to evaluate using the results of the measurements on the one or more report triggering measurement objects; and one or more quantities to be reported by the measurement report as the results of the measurements on the one or more report content measurement objects.

A9. The method of embodiment A8, wherein the signaling includes a report triggering configuration information element that indicates the one or more report triggering criterions, and includes a report content configuration information element that indicates the one or more quantities.

A10. The method of any of embodiments A1-A9, wherein at least one of the one or more report triggering measurement objects is associated with multiple report triggering criterions, wherein different ones of the multiple report triggering criterions represent different respective ranges of a certain measurement quantity.

A11. The method of embodiment A10, wherein the signaling indicates different measurement identities associated with different ones of the multiple report triggering criterions.

A12. The method of any of embodiments A1-A11, wherein each of the one or more report triggering measurement objects is a frequency, and/or wherein each of the one or more report content measurement objects is a frequency.

A13. The method of any of embodiments A1-A12, wherein the signaling is received while the wireless device is in a Radio Resource Control, RRC, connected state, and/or wherein the measurements on the one or more report triggering measurement objects is to be performed while the wireless device is in an RRC connected state.

A14. The method of any of embodiments A4-A13, wherein the one or more report triggering measurement objects comprise one or more report logging triggering measurement objects and one or more report sending triggering measurement objects, wherein the one or more report logging triggering measurement objects are one or more objects of measurements whose results are to be evaluated by the wireless device for determining whether to log the measurement report, and wherein the one or more report sending triggering measurement objects are one or more objects of measurements whose results are to be evaluated by the wireless device for determining whether to send the measurement report.

A15. The method of embodiment A14, further comprising:
- performing measurements on the one or more report logging triggering measurement objects;
- evaluating whether or not report logging criteria is met, based on results of the measurements performed on the one or more report logging triggering measurement objects;
- based on the report logging criteria being met:
  - logging the measurement report;
  - performing measurements on the one or more report sending triggering measurement objects;
  - evaluating whether or not report sending criteria is met, based on results of the measurements performed on the one or more report sending triggering measurement objects; and
  - sending or not sending the measurement report depending on whether or not the report sending criteria is met.

AA. The method of any of the previous embodiments, further comprising:
- providing user data; and
- forwarding the user data to a host computer via the transmission to a base station.

Group B Embodiments

B1. A method performed by a network node configured for use in a wireless communication network, the method comprising:
- transmitting, to a wireless device, signaling that indicates one or more report triggering measurement objects and one or more report content measurement objects, wherein the one or more report triggering measurement objects are one or more objects of measurements whose results are to be evaluated by the wireless device for determining whether to log or send a measurement report, wherein the one or more report content measurement objects are one or more objects of measurements whose results are to be reported by the measurement report, and wherein the signaling is configurable to indicate at least one report content measurement object that is different from each of the one or more report triggering measurement objects indicated by the signaling.

B2. The method of embodiment B1, further comprising receiving the measurement report from the wireless device.

B3. The method of embodiment B2, further comprising training, based on the received measurement report, a model that models a relation between one or more radio characteristics on the one or more report content measurement objects and one or more radio characteristics on the one or more report triggering measurement objects.

B4. The method of embodiment B3, further comprising predicting, based on the model and one or more radio characteristics of the one or more report triggering measurement objects, one or more radio characteristics on the one or more report content measurement objects.

B5. The method of embodiment B4, further comprising making a mobility decision for the same or a different wireless device based on said predicting.

B6. The method of any of embodiments B3-B5, further comprising selecting the one or more report content measurement objects and/or the one or more report triggering measurement objects based on an evaluation of a performance of the model.

B7. The method of any of embodiments B1-B6, further comprising selecting the one or more report content measurement objects based on one or more of:
- receiving signaling indicating detection of the one or more report content measurement objects; and
- a number of reports previously received that report measurements on the one or more report content measurement objects.

B8. The method of any of embodiments B1-B7, wherein at least one report content measurement object indicated by the signaling is different from each of the one or more report triggering measurement objects indicated by the signaling.

B9. The method of any of embodiments B1-B8, wherein each of the one or more report content measurement objects indicated by the signaling is different from each of the one or more report triggering measurement objects indicated by the signaling.

B10. The method of any of embodiments B1-B9, wherein the signaling indicates the one or more report triggering measurement objects separately from indicating the one or more report content measurement objects.

B11. The method of any of embodiments B1-B10, wherein the signaling includes a report triggering measurement object information element that indicates the one or more report triggering measurement objects and includes a report content measurement object information element that indicates the one or more report content measurement objects.

B12. The method of any of embodiments B1-B11, wherein the signaling indicates:
- one or more report triggering criterions that the wireless device is to evaluate using the results of the measurements on the one or more report triggering measurement objects; and
- one or more quantities to be reported by the measurement report as the results of the measurements on the one or more report content measurement objects.

B13. The method of embodiment B12, wherein the signaling includes a report triggering configuration information element that indicates the one or more report triggering criterions, and includes a report content configuration information element that indicates the one or more quantities.

B14. The method of any of embodiments B1-B13, wherein at least one of the one or more report triggering measurement objects is associated with multiple report triggering criterions, wherein different ones of the multiple report triggering criterions represent different respective ranges of a certain measurement quantity.

B15. The method of embodiment B14, wherein the signaling indicates different measurement identities associated with different ones of the multiple report triggering criterions.

B16. The method of any of embodiments B1-B15, wherein each of the one or more report triggering measurement objects is a frequency, and/or wherein each of the one or more report content measurement objects is a frequency.

B17. The method of any of embodiments B1-B16, wherein the signaling is transmitted while the wireless device is in a Radio Resource Control, RRC, connected state, and/or wherein the measurements on the one or more report triggering measurement objects is to be performed while the wireless device is in an RRC connected state.

B18. The method of any of embodiments B1-B17, wherein the one or more report triggering measurement objects comprise one or more report logging triggering measurement objects and one or more report sending triggering measurement objects, wherein the one or more report logging triggering measurement objects are one or more objects of measurements whose results are to be evaluated by the wireless device for determining whether to log the measurement report, and wherein the one or more report sending triggering measurement objects are one or more objects of measurements whose results are to be evaluated by the wireless device for determining whether to send the measurement report.

BB. The method of any of the previous embodiments, further comprising:

- obtaining user data; and
- forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:

- communication circuitry; and
- processing circuitry configured to perform any of the steps of any of the Group A embodiments.

C4. A wireless device comprising:

- processing circuitry configured to perform any of the steps of any of the Group A embodiments; and
- power supply circuitry configured to supply power to the wireless device.

C5. A wireless device comprising:

- processing circuitry and memory, the memory containing instructions executable by the processing circuitry whereby the wireless device is configured to perform any of the steps of any of the Group A embodiments.

C6. A user equipment (UE) comprising:

- an antenna configured to send and receive wireless signals;
- radio front-end circuitry connected to the antenna and to processing circuitry, and configured to condition signals communicated between the antenna and the processing circuitry;
- the processing circuitry being configured to perform any of the steps of any of the Group A embodiments;
- an input interface connected to the processing circuitry and configured to allow input of information into the UE to be processed by the processing circuitry;
- an output interface connected to the processing circuitry and configured to output information from the UE that has been processed by the processing circuitry; and
- a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A network node configured to perform any of the steps of any of the Group B embodiments.

C10. A network node comprising processing circuitry configured to perform any of the steps of any of the Group B embodiments.

C11. A network node comprising:

- communication circuitry; and
- processing circuitry configured to perform any of the steps of any of the Group B embodiments.

C12. A network node comprising:

- processing circuitry configured to perform any of the steps of any of the Group B embodiments;
- power supply circuitry configured to supply power to the network node.

C13. A network node comprising:

- processing circuitry and memory, the memory containing instructions executable by the processing circuitry whereby the network node is configured to perform any of the steps of any of the Group B embodiments.

C14. The network node of any of embodiments C9-C13, wherein the network node is a base station.

C15. A computer program comprising instructions which, when executed by at least one processor of a network node, causes the network node to carry out the steps of any of the Group B embodiments.

C16. The computer program of embodiment C14, wherein the network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:

- processing circuitry configured to provide user data; and
- a communication interface configured to forward the user data to a cellular network for transmission to a user equipment (UE),
- wherein the cellular network comprises a base station having a radio interface and processing circuitry, the base station's processing circuitry configured to perform any of the steps of any of the Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:

- the processing circuitry of the host computer is configured to execute a host application, thereby providing the user data; and
- the UE comprises processing circuitry configured to execute a client application associated with the host application.

D5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:

the processing circuitry of the host computer is configured to execute a host application; and the UE's processing circuitry is configured to execute a client application associated with the host application, thereby providing the user data.

D18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:

at the UE, executing a client application, thereby providing the user data to be transmitted; and at the host computer, executing a host application associated with the client application.

D22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

D27. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method performed by a wireless device configured for use in a wireless communication network, the method comprising:

receiving, from a network node in the wireless communication network, signaling that indicates one or more report triggering measurement objects and one or more report content measurement objects, wherein the one or more report triggering measurement objects are one or more measurement objects on which the wireless device is to perform first measurements, with results of those first measurements to be evaluated by the wireless device for determining whether or not to log or send a measurement report, wherein the one or more report content measurement objects are one or more measurement objects on which the wireless device is to perform second measurements, with results of those second measurements to be reported by the measurement report, wherein the signaling is configurable to indicate at least one report content measurement object that is different from each of the one or more report triggering measurement objects indicated by the signaling, wherein the signaling is configurable to indicate at least one report triggering measurement object that is different from each of the one or more report content measurement objects indicated by the signaling, such that results of first measurements on the at least one report triggering measurement object are not to be reported by the measurement report, and wherein each of the one or more report triggering measurement objects, and each of the one or more report content measurement objects, is a single carrier frequency, a set of one or more carrier frequencies, a set of one or more cells, a set of one or more network identifiers, or a set of one or more transmission resource pools.

2. The method of claim 1, wherein the signaling indicates at least one report triggering measurement object that is different from each of the one or more report content measurement objects indicated by the signaling, and wherein the method further comprises:

performing the first measurements on the one or more report triggering measurement objects;

based on results of the first measurements performed on the one or more report triggering measurement objects, evaluating whether or not to log or send a measurement report that reports at least results of the second measurements performed on the one or more report content measurement objects, but that does not report results of the first measurements performed on the at least one report triggering measurement object that is different from each of the one or more report content measurement objects; and logging or sending the measurement report, or refraining from logging or sending the measurement report, depending on said evaluating.

3. The method of claim 1, wherein at least one report content measurement object indicated by the signaling is different from each of the one or more report triggering measurement objects indicated by the signaling and at least one report triggering is different from each of the one or more report content measurement objects indicated by the signaling.

4. The method of claim 1, wherein the signaling includes a report triggering measurement object information element that indicates the one or more report triggering measurement objects and includes a report content measurement object information element that indicates the one or more report content measurement objects.

5. The method of claim 1, wherein the signaling indicates:

one or more report triggering criterions that the wireless device is to evaluate using the results of the first measurements on the one or more report triggering measurement objects; and one or more quantities to be reported by the measurement report as the results of the first measurements on the one or more report content measurement objects.

6. The method of claim 5, wherein the signaling includes a report triggering configuration information element that indicates the one or more report triggering criterions, and includes a report content configuration information element that indicates the one or more quantities.

7. The method of claim 1, wherein at least one of the one or more report triggering measurement objects is associated with multiple report triggering criterions, wherein different ones of the multiple report triggering criterions represent different respective ranges of a certain measurement quantity.

8. The method of claim 7, wherein the signaling indicates different measurement identities associated with different ones of the multiple report triggering criterions.

9. The method of claim 2, wherein at least one report content measurement object indicated by the signaling is different from each of the one or more report triggering measurement objects indicated by the signaling, wherein the method further comprises:

performing the second measurements on the one or more report content measurement objects; and based on logging or sending of the measurement report being triggered by the results of the first measurements performed on the one or more report triggering measurement objects according to said evaluating, logging or sending the measurement report with the measurement report reporting results of the second measurements performed on the one or more report content measurement objects, but with the measurement report not reporting results of the first measurements performed on the at least one report triggering measurement object that is different from each of the one or more report content measurement objects.

10. The method of claim 2, wherein the signaling indicates at least one report triggering measurement object that is different from each of the one or more report content measurement objects indicated by the signaling, and wherein the method further comprises, based on logging or sending of the measurement report being triggered by results of the first measurements performed on the one or more report triggering measurement objects indicated by the signaling, logging or sending a measurement report that:

reports results of the second measurements performed on the one or more report content measurement objects; and does not report results of the first measurements performed on the at least one report triggering measurement object that is different from each of the one or more report content measurement objects.

11. The method of claim 2, wherein the each report content measurement object is different from each of the one or more report triggering measurement objects indicated by the signaling, and each report triggering measurement object is different from each of the one or more report content measurement objects indicated by the signaling.

12. A method performed by a network node configured for use in a wireless communication network, the method comprising:

transmitting, to a wireless device, signaling that indicates one or more report triggering measurement objects and one or more report content measurement objects, wherein the one or more report triggering measurement objects are one or more measurement objects on which the wireless device is to perform first measurements, with results of those first measurements to be evaluated by the wireless device for determining whether or not to log or send a measurement report, wherein the one or more report content measurement objects are one or more measurement objects on which the wireless device is to perform second measurements, with results of those second measurements to be reported by the measurement report, wherein the signaling is configurable to indicate at least one report content measurement object that is different from each of the one or more report triggering measurement objects indicated by the signaling, wherein the signaling is configurable to indicate at least one report triggering measurement object that is different from each of the one or more report content measurement objects indicated by the signaling, such that results of first measurements on the at least one report triggering measurement object are not to be reported by the measurement report, and wherein each of the one or more report triggering measurement objects, and each of the one or more report content measurement objects, is a single carrier frequency, a set of one or more carrier frequencies, a set of one or more cells, a set of one or more network identifiers, or a set of one or more transmission resource pools.

13. The method of claim 12, wherein the signaling indicates at least one report triggering measurement object that is different from each of the one or more report content measurement objects indicated by the signaling, and wherein the method further comprises, and wherein the method further comprises receiving the measurement report from the wireless device, wherein the measurement report reports at least results of the second measurements performed on the one or more report content measurement objects, but does not report results of the first measurements performed on the at least one report triggering measurement object that is different from each of the one or more report content measurement objects.

14. The method of claim 13, further comprising training, based on the received measurement report, a model that models a relation between one or more radio characteristics on the one or more report content measurement objects and one or more radio characteristics on the one or more report triggering measurement objects.

15. The method of claim 14, further comprising predicting, based on the model and one or more radio characteristics of the one or more report triggering measurement objects, one or more radio characteristics on the one or more report content measurement objects.

16. The method of claim 15, further comprising making a mobility decision for the same or a different wireless device based on said predicting.

17. The method of claim 14, further comprising selecting the one or more report content measurement objects and/or the one or more report triggering measurement objects based on an evaluation of a performance of the model.

18. The method of claim 12, further comprising selecting the one or more report content measurement objects based on one or more of:

receiving signaling indicating detection of the one or more report content measurement objects; and a number of reports previously received that report measurements on the one or more report content measurement objects.

19. The method of claim 12, wherein at least one report content measurement object indicated by the signaling is different from each of the one or more report triggering measurement objects indicated by the signaling and at least one report triggering is different from each of the one or more report content measurement objects indicated by the signaling.

20. A wireless device configured for use in a wireless communication network, the wireless device comprising:

communication circuitry; and processing circuitry configured to receive, via the communication circuitry, from a network node in the wireless communication network, signaling that indicates one or more report triggering measurement objects and one or more report content measurement objects, wherein the one or more report triggering measurement objects are one or more measurement objects on which the wireless device is to perform first measurements, with results of those first measurements to be evaluated by the wireless device for determining whether or not to log or send a measurement report, wherein the one or more report content measurement objects are one or more measurement objects on which the wireless device is to perform second measurements, with results of those second measurements to be reported by the measurement report, wherein the signaling is configurable to indicate at least one report content measurement object that is different from each of the one or more report triggering measurement objects indicated by the signaling, wherein the signaling is configurable to indicate at least one report triggering measurement object that is different from each of the one or more report content measurement objects indicated by the signaling, such that results of first measurements on the at least one report triggering measurement object are not to be reported by the measurement report, and wherein each of the one or more report triggering measurement objects, and each of the one or more report content measurement objects, is a single carrier frequency, a set of one or more carrier frequencies, a set of one or more cells, a set of one or more network identifiers, or a set of one or more transmission resource pools.

21. The wireless device of claim 20, wherein the signaling indicates at least one report triggering measurement object that is different from each of the one or more report content measurement objects indicated by the signaling, the processing circuitry further configured to:

perform the first measurements on the one or more report triggering measurement objects;

based on results of the first measurements performed on the one or more report triggering measurement objects, evaluate whether or not to log or send a measurement report that report at least results of the second measurements performed on the one or more report content measurement objects, but that does not report results of the first measurements performed on the at least one report triggering measurement object that is different from each of the one or more report content measurement objects; and log or send the measurement report, or refrain from logging or sending the measurement report, depending on the evaluation of whether or not to log or send the measurement report.

22. The wireless device of claim 20, wherein at least one report content measurement object indicated by the signaling is different from each of the one or more report triggering measurement objects indicated by the signaling and at least one report triggering measurement object is different from each of the one or more report content measurement objects indicated by the signaling.

23. The wireless device of claim 21, wherein at least one report content measurement object indicated by the signaling is different from each of the one or more report triggering measurement objects indicated by the signaling, the processing circuitry further configured to:

perform the second measurements on the one or more report content measurement objects; and based on logging or sending of the measurement report being triggered by the results of the first measurements performed on the one or more report triggering measurement objects according to said evaluating, log or send the measurement report with the measurement report reporting results of the second measurements performed on the one or more report content measurement objects, but with the measurement report not reporting results of the first measurements performed on the at least one report triggering measurement object that is different from each of the one or more report content measurement objects.

24. A network node configured for use in a wireless communication network, the network node comprising:

communication circuitry; and processing circuitry configured to transmit, via the communication circuitry, to a wireless device, signaling that indicates one or more report triggering measurement objects and one or more report content measurement objects, wherein the one or more report triggering measurement objects are one or more measurement objects on which the wireless device is to perform first measurements, with results of those first measurements to be evaluated by the wireless device for determining whether or not to log or send a measurement report, wherein the one or more report content measurement objects are one or more measurement objects on which the wireless device is to perform second measurements, with results of those second measurements to be reported by the measurement report, wherein the signaling is configurable to indicate at least one report content measurement object that is different from each of the one or more report triggering measurement objects indicated by the signaling, wherein the signaling is configurable to indicate at least one report triggering measurement object that is different from each of the one or more report content measurement objects indicated by the signaling, such that results of first measurements on the at least one report triggering measurement object are not to be reported by the measurement report, and wherein each of the one or more report triggering measurement objects, and each of the one or more report content measurement objects, is a single carrier frequency, a set of one or more carrier frequencies, a set of one or more cells, a set of one or more network identifiers, or a set of one or more transmission resource pools.

* * * * *